United States Patent
McBurney et al.

(10) Patent No.: US 6,473,030 B1
(45) Date of Patent: Oct. 29, 2002

(54) INFRASTRUCTURE-AIDING FOR SATELLITE NAVIGATION RECEIVER AND METHOD

(75) Inventors: Paul W. McBurney, San Francisco, CA (US); Arthur N. Woo, Cupertino, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 0 days.

(21) Appl. No.: 09/797,521

(22) Filed: Feb. 28, 2001

(51) Int. Cl.[7] ............................. G01S 5/02; H04B 7/185
(52) U.S. Cl. ........................ 342/357.03; 342/357.09; 342/357.1; 701/214; 701/215
(58) Field of Search ................. 342/357.09, 357.1, 342/357.02, 357.03; 455/456; 701/214, 215

(56) References Cited

U.S. PATENT DOCUMENTS

| | | | | |
|---|---|---|---|---|
| 6,131,067 A | * | 10/2000 | Girerd et al. | 701/213 |
| 6,281,834 B1 | * | 8/2001 | Stilp | 342/174 |
| 6,334,059 B1 | * | 12/2001 | Stilp et al. | 455/456 |

* cited by examiner

Primary Examiner—Theodore M. Blum

(57) ABSTRACT

A navigation system comprises a cell-phone, a base cellular telephone site, and a webserver. Each is paired with a GPS receiver. The GPS receiver associated with the cell-phone is aided with information received from the cell-site and webserver that help reduce satellite search uncertainty. Time difference and/or frequency difference measurements are taken with data collected from what the cell-phone and its GPS receiver assume to be accurate time and frequency. Correction information is used in post-processing of the velocity solutions computed by the cell-phone to arrive at more precise determinations for the system.

16 Claims, 6 Drawing Sheets

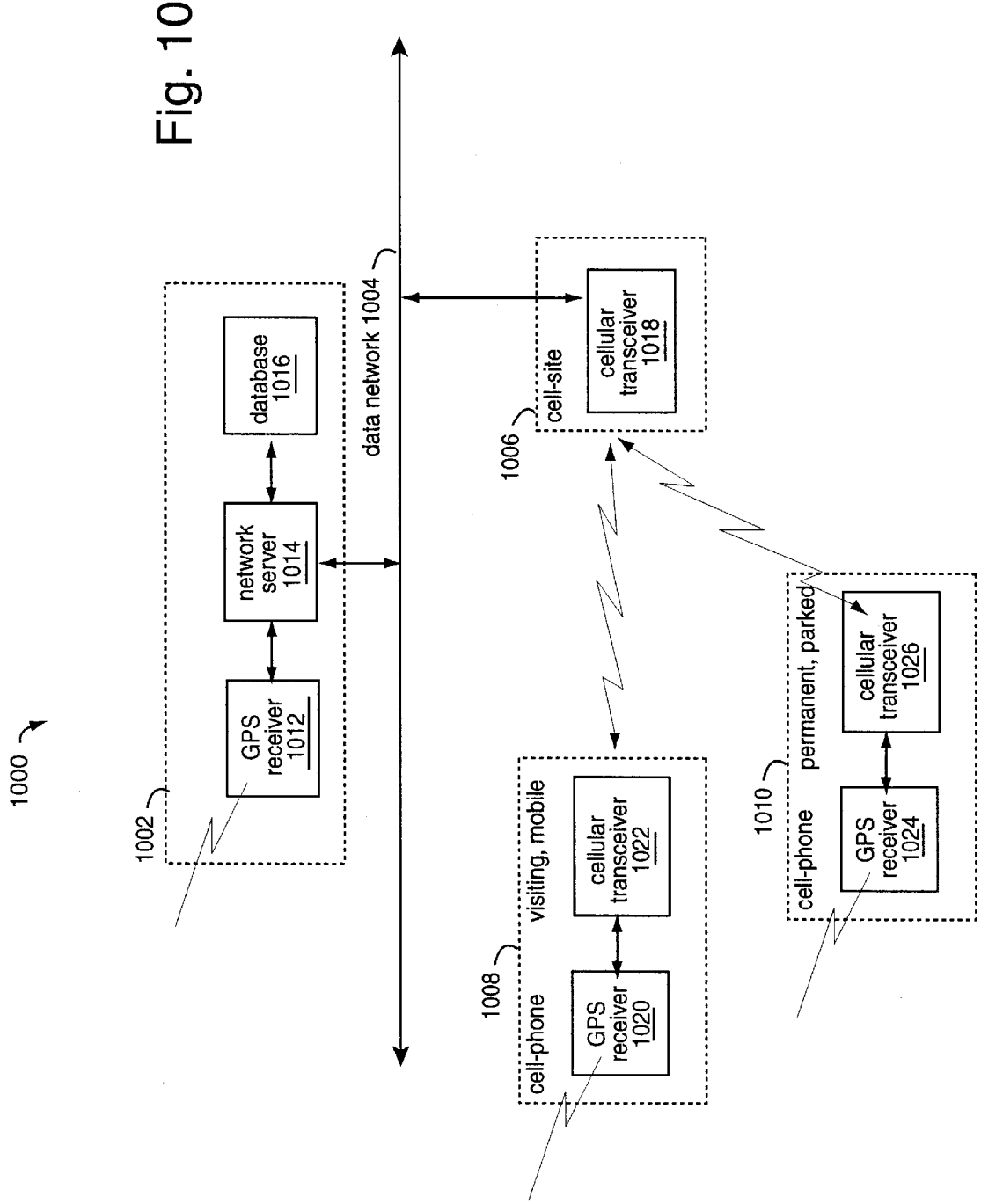

INFRASTRUCTURE-AIDING FOR SATELLITE NAVIGATION RECEIVER AND METHOD

RELATED PATENT APPLICATION

U.S. patent application Ser. No. 09/687,044, filed Oct. 11, 2000, and titled SATELLITE NAVIGATION RECEIVER AND METHOD is incorporated herein by reference.

FIELD OF THE INVENTION

The present invention relates to satellite-navigation receivers and systems, and more particularly to minimal-cost field devices that are assisted with information about precise time and frequency by a network to improve time-to-first-fix, accuracy, and manufacturing costs of the field devices.

DESCRIPTION OF THE PRIOR ART

Global positioning system (GPS) receivers use signals received from typically three or more earth-orbiting satellites to determine navigational data such as position and velocity. GPS signals are available worldwide at no cost and are now being routinely used to determine the location of automobiles to within one city block, or better. Dual-frequency carrier GPS receivers typically track a pair of radio carriers, L1 and L2, associated with the GPS satellites to generate accumulated delta-range measurements (ADR) from P-code modulation on those carrier frequencies and at the same time track L1 C/A-code to generate code phase measurements. Carrier frequency L1 is allocated to 1575.42 MHz and carrier frequency L2 is positioned at 1227.78 MHz. Less expensive receivers tune only one carrier frequency, and therefore do not have adequate information to compute the local troposheric and ionospheric signal-propagation delays that appear as position errors. At such frequencies, radio carrier signals travel by line-of-sight. Thus buildings, mountains and the horizon can block reception, and multipath reflections can interfere with good reception.

Each one of the constellation of GPS satellites in orbit about the earth transmits one of thirty-two unique identifying codes in a code-division multiple access (CDMA) arrangement. Such allows all of the many GPS satellites to transmit in spread spectrum mode at the same frequency, plus or minus a Doppler frequency shift of that frequency as results from the satellite's relative velocity. Particular satellites are sorted out of a resulting jumble of signals and noise by correlating a 1023 "chip" code to one of the thirty-two pseudo random number (PRN) sequence codes that are preassigned to individual GPS satellites. These codes are not necessarily being transmitted in phase with one another. Therefore, "finding" a GPS satellite initially involves searching various carrier frequencies, to account for Doppler frequency shift and local crystal oscillator inaccuracies. The searching also needs to find a code match, using 1023 different code phases and twenty or more possible correlation code templates.

The single largest uncertainty stems from the random frequencies possible from typical local oscillators at start-up. Therefore, the apparent-Doppler frequency is known only within wide search boundaries. Knowing the actual Doppler frequency is not much help, because the local oscillator can be so far off nominal on its own.

From the user's standpoint, at least two operational characteristics of prior art GPS receivers interfere with complete satisfaction. Such conventional receivers often quit working indoors because the buildings reduce the local signal field level to less than the receiver's maximum sensitivity. And, most receivers take a very long time to produce a position solution from a cold start.

Intensive calculations in GPS receivers have necessitated high clock speeds and lots of expensive storage memory. These, in turn, demand expensive and comprehensive hardware. Manufacturers and users alike would appreciate lighter and thinner navigation solutions that could use inexpensive platforms or share pre-existing platforms for other applications.

The Internet also represents a way for individual GPS receivers to monitor differential correction data in their areas and to off-load calculation-intensive tasks on regional webservers that have high performance processors.

SnapTrack, Inc., (San Jose, Calif.) is a commercial supplier of wireless assisted GPS (WAG) systems. Time, frequency, and approximate location data are extracted from a wireless network to assist GPS-signal processing in a navigation receiver. Such technology is described in a number of United States Patents assigned to SnapTrack, including: U.S. Pat. Nos. 5,945,944; 5,663,734; 5,781,156; 5,825,327; 5,831,574; 5,841,396; 5,812,087; 5,874,914; 5,884,214; etc. Also see, U.S. Pat. No. 6,078,290.

SUMMARY OF THE INVENTION

It is therefore an object of the present invention to provide a satellite-navigation receiver that can work indoors with extremely low signal-strength levels.

It is another object of the present invention to provide a satellite-navigation receiver that produces position solutions rapidly after each cold start.

It is a further object of the present invention to provide a satellite-navigation system that is inexpensive.

It is a still further object of the present invention to provide a satellite-navigation system that interfaces with the Internet.

Briefly, a system embodiment of the present invention comprises a cell-phone, a base cellular telephone site, and a webserver. Each is paired with a GPS receiver. The GPS receiver associated with the cell-phone is aided with information received from the cell-site and webserver that help reduce satellite search uncertainty. Time difference and/or frequency difference measurements are taken with data collected from what the cell-phone and its GPS receiver assume to be accurate time and frequency. Correction information is used in post-processing of the velocity solutions computed by the cell-phone to arrive at more precise determinations for the system.

An advantage of the present invention is that a system and method are provided that reduce the costs of user navigation equipment.

Another advantage of the present invention is that a system and method are provided that improve sensitivity and time-to-first-fix enough for urban canyon and indoor use.

A further advantage of the present invention is that a system and method are provided that makes higher level database services to be offered on the Internet which are related to real-time and historical user position fixes.

These and other objects and advantages of the present invention will no doubt become obvious to those of ordinary skill in the art after having read the following detailed description of the preferred embodiments which are illustrated in the various drawing figures.

IN THE DRAWINGS

Figure 9:
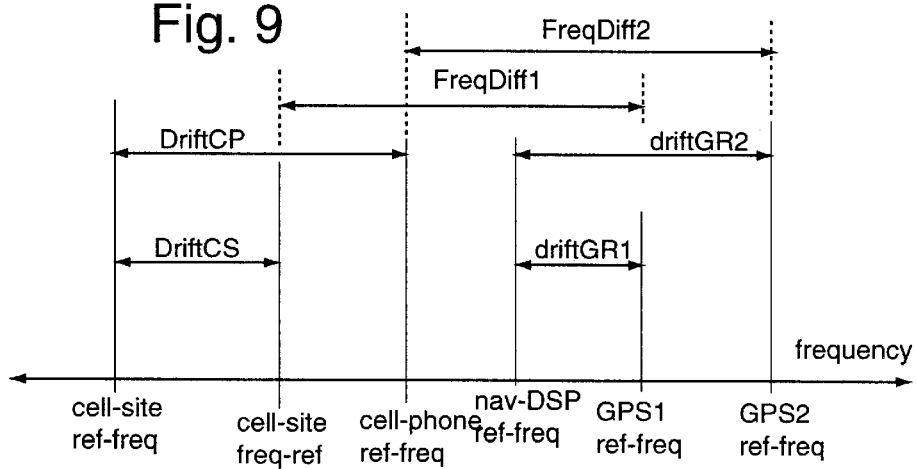

FIG. 9 is a chart of the frequency relationships amongst the cell-site, cell-phone, and GPS receiver 1-PPS outputs; and FIG. 10 is a functional block diagram of a second infrastructure-assisted navigation system embodiment of the present invention wherein no political or economic opportunity existed to include a GPS receiver at a cellular-telephone base site, so a cell-phone and GPS receiver combination was permanently parked at a stationary location to serve instead.

DETAILED DESCRIPTION OF THE PREFERRED EMBODIMENT

Three hardware-based measurements can be used to synchronize the local clocks in two independent systems, e.g., (1) time-difference, (2) frequency difference, and (3) crystal temperature-versus-frequency models. Any or all three can be used to synchronize clocks. In a timeDiff observable, if the time difference between time events from two different time sources is known, the time of an event at one time source can be used to compute the time of the event at the other time source. In a freqDiff observable, if the frequency difference between two clocks is known, then finding the frequency of one can be used to predict the frequency of the other. In a tempMeas observable, a temperature-frequency calibration model is used to predict the frequency of a local GPS clock by measuring the crystal temperature. If one of the time sources is a GPS receiver, other clocks can be related to GPS time. Such potentially allows devices all around the world to be time and frequency synchronized to a common and stable reference, for example, the GPS system atomic clocks.

Figure 1:
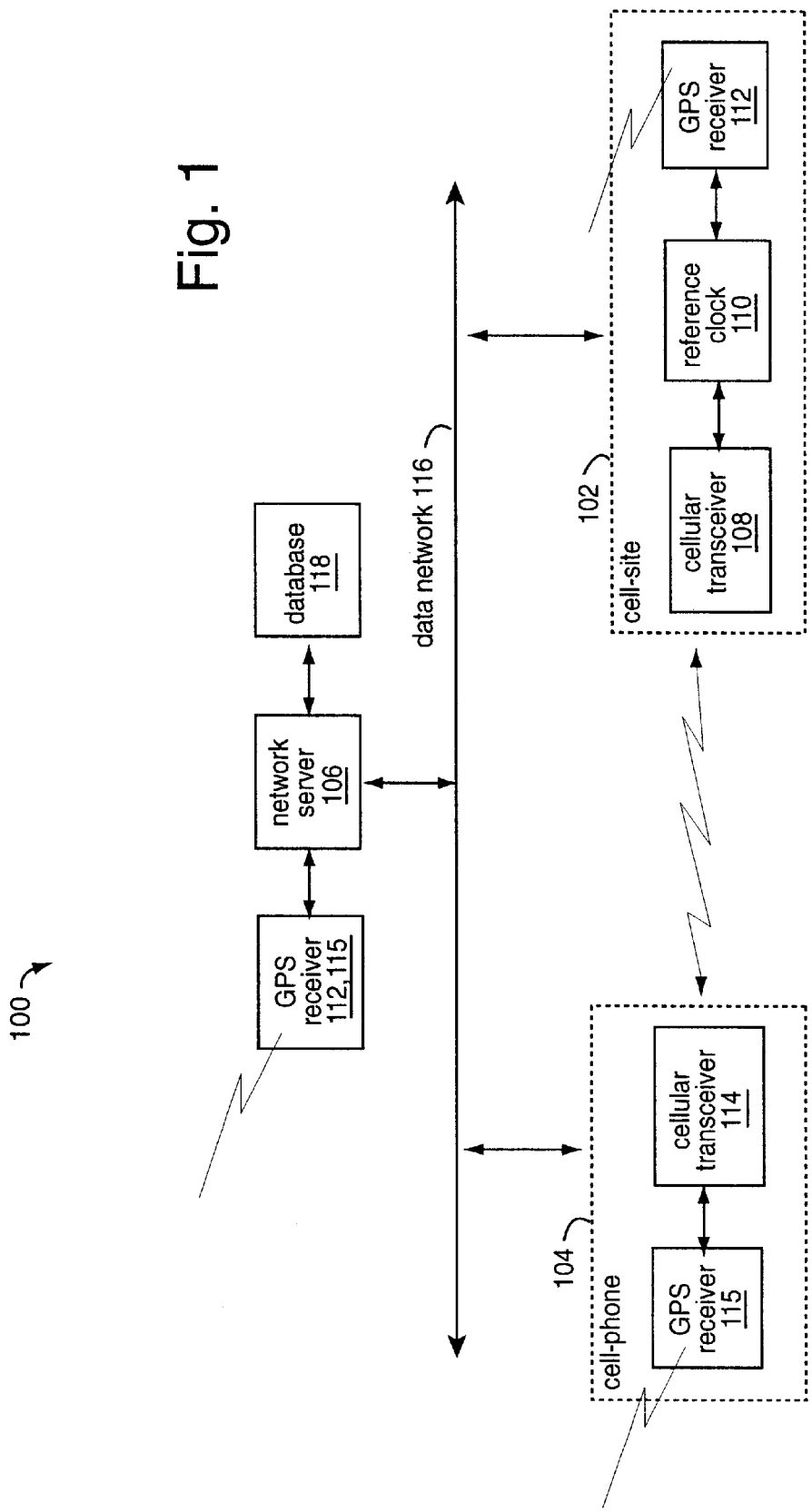
FIG. 1 is a functional block diagram of an infrastructure-assisted navigation system embodiment of the present invention that includes a cellular telephone, a cellular-telephone base site, and a webserver.

FIG. 1 illustrates a system 100, in an embodiment of the present invention, that includes a cell-site 102, at least one cell-phone 104, and a network server 106. The cell-site 102 comprises a cellular transceiver 108, its reference clock 110, and a GPS receiver-112. The cell-phone 104 has a cellular-phone-service-band receiver 114 that is used to track the frequency and phase of signals it receives from the cell-site 102. The cell-phone 104 also includes its own GPS receiver-115. The network server 106 receives and distributes time information and other data from both the cell-site and cell-phone GPS receivers over a data network 116. A database 118 of positions and their time and frequency offsets from GPS time is collected for later reference.

Passive network synchronization embodiments of the present invention use the cell-site GPS receiver to synchronize the cell-site clocks to GPS time. Then both the cell-phone GPS receiver clock and the cell-phone clock can be synchronized to GPS time by the network server over a network infrastructure, e.g., the Internet. A typical GPS receiver generates a one-pulse-per-second (1-PPS) time reference that can be compared and related with timeDiff circuitry to a 1-PPS clock derived from each of the cell-site and cell-phone cellular-telephony radio carriers. Other observation intervals besides one second would also work the same way, but the mathematics are simpler when a one second time interval is used.

Embodiments of the present invention can use three different communication links to transfer time and frequency data. One links the GPS reference receivers 112 at the cell-site 102 with the network server 106. A second carries software-API or packet-communication between the cell-phone 114 and GPS receiver 115 in the cell-phone, either directly in the cell-phone or indirectly through the network server. Sharing data directly between the receivers helps improve system performance. A third connection links the network server 106 and cell-phone to both the cell-phone and GPS receiver. The network server 106 can also be located at the cell-site 102 and communicate via the cellular telephony system transceivers 108 and 114.

Time-difference-of-arrival measurements (TDOA), e.g., from a cell-site to a cell-phone, can be used for positioning inside a combined cell-phone and GPS receiver to improve positioning availability and accuracy. Time-stamps sent from the cell-site to the cell-phone can be combined with a priori knowledge of the cell-site position, the cell-site clock bias and the cell-site drift from GPS time. Such time-stamps can be used to transfer time information from the cell-site to the cell-phone with an accuracy affected only by the radio-signal propagation distance between the cell-phone and the cell-site.

The corrective frequency offset of the cell-phone carrier-frequency synthesizer loop can be used to estimate the GPS receiver frequency offset. Such estimate is used to reduce the frequency uncertainty and thus reduce the time-to-first-fix, improve receiver sensitivity, and/or reduce the size and power-consumption of the hardware. Digital numeric-controlled oscillator (NCO) and analog voltage-controlled oscillator (VCO) are both commonly used in such carrier-frequency synthesizer loops.

The tempMeas measurement can be used to further improve the frequency-transfer accuracy passing from a cell-phone to a GPS receiver. The freqDiff observation can be used alone in frequency transfers without any timeDiff observation. The timeDiff observation can also be used without the freqDiff observation for combined time and frequency transfers. The time transfer accuracy is preferably improved by reducing the timeDiff hardware quantization noise with software-based filters. Cell-phone observations of the cell-site frequency and phase can be used in dual-mode positioning system alternative embodiments of the present invention.

The term "passive synchronization" as used herein means the time and frequency offsets of the clocks in the cell-site and cell-phone are only observed with respect to a GPS receiver clock. Calibrations are made later by sending the measured offsets through the communication layers, e.g., using transfer control protocol/Internet protocol (TCP/IP) packets on the Internet. The real clocks in the cell-phone and cell-site are not controlled. The signals from these clocks are merely observed, and the corrective data obtained is not in any way fed back to the source to change the clocks. Rather, the data is used mathematically at the network server and in the GPS receiver software to assist in the GPS-satellite search and then in the position calculation.

Figure 2:
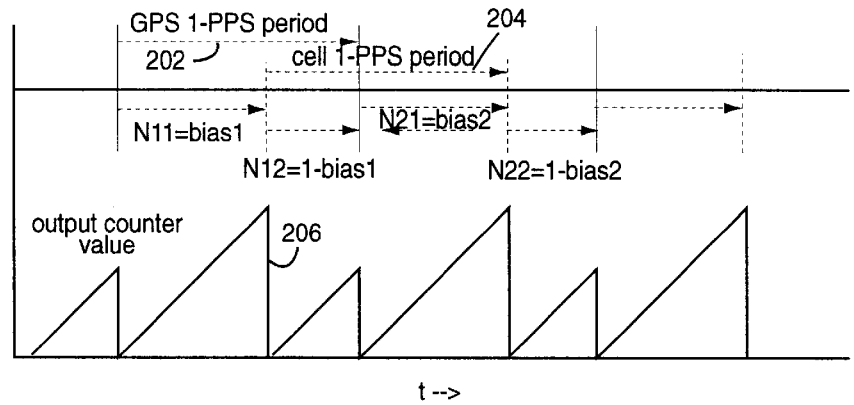
FIG. 2 is a diagram representing how the differences in two different clocks can be quantified as clock pulse accumulations in digital counters.

FIG. 2 diagrams the time relationships between a GPS 1-PPS per 202, a cell 1-PPS period 204, and an output counter value 206. A timeDiff observation can be made with a counter circuit that uses a GPS master clock for its input frequency. The number of internal clocks are counted between the two event sources, e.g., the internal 1-PPS 202 and the external (or cell) 1-PPS 204. The result is periodically output and the counter is restarted, such that for every second of time there will be two counter outputs.

Both output count values can be combined to estimate a key parameter, the bias between the two clock sources. Each restart at the external 1-PPS 204 produces a bias result. If the counter is instead restarted on the internal 1-PPS 202, the result is one minus the bias. The external 1-PPS (from the cell-site or cell-phone) can be synchronized to the internal 1-PPS (the GPS receiver) in one of at least two ways, e.g., with a smooth steered or an unsteered internal 1-PPS.

Figure 3:
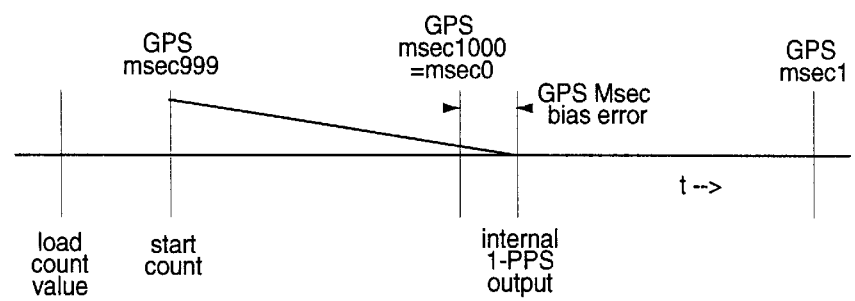
FIG. 3 is a diagram representing a bias skew of a second event in the last one-thousandth part of a 1-PPS period.

Referring now to FIG. 3, it is assumed that a GPS 1-PPS timing edge is accurately slaved to GPS system time. In this way, the GPS 1-PPS timing edge represents "true" GPS time. A 1-PPS edge can be generated by a countdown circuit that is started by a 999th-millisecond interrupt derived from the GPS-integer second. An interrupt range of ±1 millisecond is preferred so that the 1-PPS can be adjusted to occur anywhere between msec-999 and msec-1 in the GPS-integer second. A msec-bias error is computed in the GPS receiver as the GPS-millisecond timer to "true" GPS-time error. If the GPS-receiver oscillator drifts from GPS time, such msec-bias error will change. The countdown value will also change to reflect the drift. When the bias integrates more than ±0.5 msec, the GPS millisecond counter is preferably adjusted to keep the circuit in range.

The smooth-steered method embodiment of the present invention is used in GPS receivers at the cell-sites since the msec-bias error is known. Time is known in the GPS receiver and can be passively transferred to the cell-site by measuring any offset between GPS time and a cell-site time reference.

The time associated with the cell-site 1-PPS can be computed as, TimeCS equals timeGPS+biasCSG. Wherein, the variable biasCSG represents the time offset between the cell-site and GPS time. It is estimated using a function that uses either a snapshot or a filtered estimate using the time-series of the measurements Ni1, Ni2, for all i.

The unsteered internal 1-PPS method embodiment of the present invention does not use the additional countdown circuit. The internal 1-PPS is generated directly from the millisecond interrupt corresponding to the integer GPS second event. Such still requires that the millisecond interrupt that corresponds to the GPS integer second be periodically shifted when the msec-bias error grows beyond a predetermined threshold. The time between internal PPS events can be greater or less than one second. The step shifts that occur are brief, and do not adversely affect the receiver. It knows when the event will occur, and the 1-msec shift can be accounted for in the computed residual msec-bias error.

The unsteered reference can be used by a GPS receiver in a cell-phone whenever the position is being requested from the cell-phone user interface. Such GPS receiver is typically not tracking satellites at the moment, and so the GPS msec-bias error will be unknown. The inverse problem exists in the cell-phone. GPS time is not known, and time is being transferred from the cell network to the cell-phone.

In operation, the time and frequency offset of a particular cell-site is obtained from a network server. The position of the cell-site is also useful in the solution calculations. The offset between the cell-phone clock and the GPS receiver clock is measured. An estimate of the GPS receiver time and frequency offset is computed from GPS time, and is used to reduce the GPS satellite search range.

The timeDiff observation is used in both the cell-phone and the cell-site to reduce the total number of unknowns in the system. The timeDiff measurement is defined herein as the difference in time between two time events generated by two different sources. Both clocks generate a signal with the same expected period based on the expected nominal frequency of each clock. The measurement is the number of clocks between consecutive events.

Because all clocks have some frequency offset from the desired nominal frequency, the Bias is also constantly changing due to the effect of the frequency offset from nominal of both clocks.

Suppose that "Freq" equals the actual physical frequency that is observed, it also equals baseFreq+drift (eq2). The "baseFreq" equals a desired frequency, e.g., the clock is designed to operate at this frequency but appears as "Freq" due to imperfections, aging, and temperature effects, the actual frequency appears. "Drift" equals frequency offset between the current frequency and the desired nominal frequency.

Assume now that both clocks generate asynchronous one-second time event signal pulses with a specific time interval between. A one-second event can be generated with a counter that counts a specific number of reference clocks and then outputs a pulse when the desired count is reached. The one-second count number is the nominal crystal frequency.

The actual time produced is equal to the number of clocks times the "true" period of each clock. Assuming a constant drift, the "true" period of each clock is the "ClockPeriod" variable, which equals the inverse of the frequency in Hertz.

The actual time period produced, DT, equals baseFreq/freq. Inserting equation-2, $$DT = freq - drift/freq \qquad \text{(equation-3)}$$
$$= 1 - drift/freq$$
$$= 1 + deltaBias,$$

where, deltaBias equals the change in the bias that occurs between the two events.

The effect of equation-3 is that with each one-second event, accumulate an additional increment to the total bias.

For the 1-PPS made with a steering clock when GPS time is known, the offset can be estimated from GPS time and steer the clock to always be within one clock of the "true" time that was desired at the event.

Alternatively, the 1-PPS can be left unsteered. The total bias is maintained in software and accounted for without a loss of synchronization when all calibration is in software.

Extending to two clocks, baseGRfreq equals the expected the frequency of clock used in the GPS receiver (Hz).

"BaseCSfreq" equals the expected frequency of the clock used in the cell-site (Hz). "FreqGR" equals the actual observed frequency of the GPS receiver (Hz). "FreqCS" equals the actual observed frequency of the cell-site (Hz). "BiasGRi" equals the bias of a GPS receiver's 1-PPS from "true" GPS time at time Ti. "BiasCSi" equals the bias of a cell-site's 1-PPS from "true" GPS time at time Ti. "DeltaBiasGR12" equals the change in bias in the GPS receiver from t1 to t2. "DeltaBiasCS12" equals the change in bias in the cell-site from t1 to t2.

A reference clock and an unknown clock are defined, then the GPS clock is chosen to be the reference. It can synchronized to GPS by tracking the satellites.

The cell-site is defined to be the unknown clock that is to be synchronized to GPS time.

The "true" time between the GPS and cell-site events is defined. TDij equals "true" time between two consecutive events in the i-th time where the source of the newest event is the j-th source. J=1 is the cell-site and j=2 equals the GPS receiver.

Figure 4:
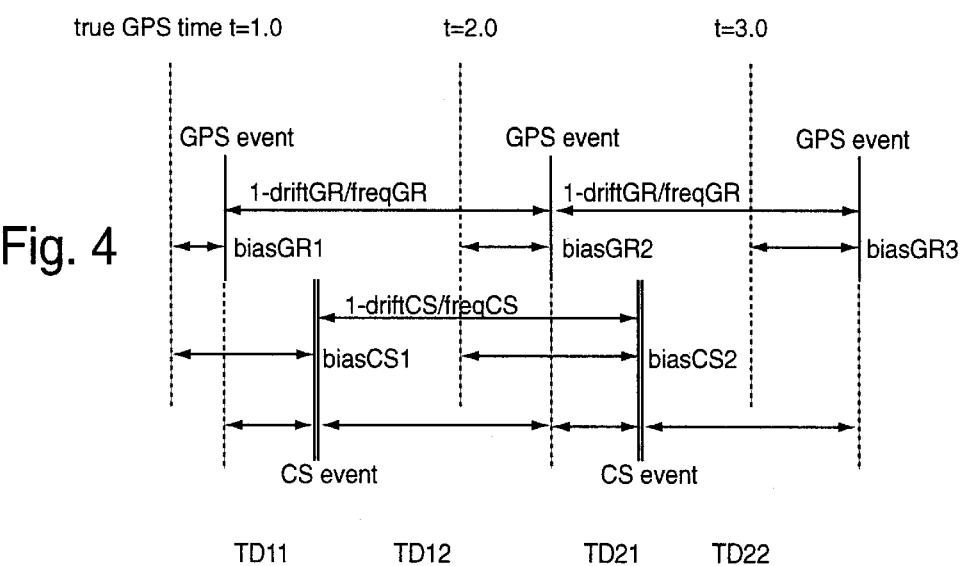
FIG. 4 is a diagram of the relationships between GPS events, cell-site events, and the various kinds of timing bias that are computed by embodiments of the present invention.

FIG. 4 represents the relationships between the "true" GPS 1-PPS events, the actual locations of the 1-PPS events, and the "true" tDiff observations. These observations can be made,

```
BiasGR2 = biasGR1 + deltaBiasGR12
       = biasGR1 - driftGR/freqGR
BiasCS2 = biasCS1 + deltaBiasCS12
       = biasCS1 - driftCS/freqCS,
TD11 = (1 + biasCS1) - (1 + biasGR1)
     = biasCS1 - biasGR1
TD12 = (1 + biasGR1 + (1 - driftGR/freqGR)) - (1 + biasCS1)
     = 1 + biasGR1 - driftGR/freqGR - biasCS1
     = 1 + biasGR1 + deltaBiasGR12 - biasCS1
     = 1 + biasGR2 - biasCS1
     = 1 - (biasCS1 - biasGR2)
TD21 = (1 + biasCS1 + (1 - driftCS/freqCS)) - (1 + biasGR1 + (1-
driftGR/freqGR))
     = (2 + biasCS1 + deltaBiasCS12) - (2 + biasGR1 + deltaBiasGR12)
     = biasCS2 - biasGR2
TD22 = (1 + biasGR1 + (1 - driftGR/freqGR) + (1 - driftGR/freqGR)) -
(1 + biasCS1 + (1 - driftCS/freqCS))
     = 1 + biasGR1 - driftGR/freqGR - driftGR/freqGR - (biasCS1 -
driftCS/freqCS)
     = 1 + biasGR1 + deltaBiasGR12 + deltaBiasGR23 -
(biasCS1 + deltaBiasCS12)
     = 1 - (biasCS2 - biasGR3).
```

Summarizing, if cell-site is the source at time t=i, then j=1 and, $$TDi1 = biasCS(t=i) - biasGR(t=i), \quad (eq4)$$

if GR is the source, at time t=I, then j=2 and $$TDi2 = 1 - ((biasCS(t=i) - biasGR(t=i+1)). \quad (eq5)$$

The quantization error is harder to remove when only the timeDiff observable is available, and this motivates gathering the freqDiff measurement. Such allows the quantization noise to be reduced by filtering, and higher frequency clocks are not needed. Avoiding higher frequency clocks allows a system operating power savings to be realized, and is very important in battery-operated portable devices.

Two important parameters can be estimated from the timeDiff observables, the bias from GPS time of the cell-site, and the frequency drift of the cell-site. The frequency drift estimate is then correlated with the bias estimate, and no new information is needed to filter the cell-site bias estimates.

Figure 5:
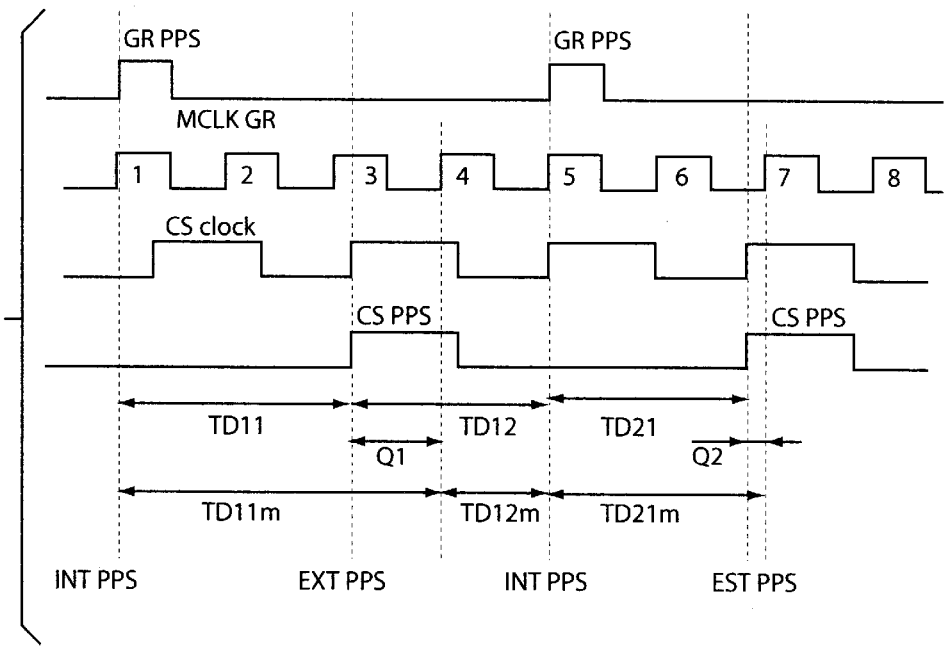
FIG. 5 is a timing diagram representing the relationships between clocks and time periods in support of the mathematical equations presented herein.

FIG. 5 represents a redrawing of the timeline and allows the effects of the quantization error to be seen. N11 equals three because the first cell-site PPS is reported on MCLK3 due to the clock synchronization. The "true" measurement TD11 is equal to the measured count (TD11m) minus the quantization Q1.

The "true" time difference is the "true" number of clocks (integer plus fraction, which is the quantization) times the period of the clock. Assume the frequency was constant over the interval, then the period is the inverse of the "true" frequency. The "truth" model for the ideal measurement is shown below.

The "true" time differences are defined as, $TD11$ equals $(N11-Q1)/freqGR$ $TD12$ equals $(N12+Q1)/freqGR$ $TD21$ equals $(N21-Q2)/freqGR$.

The measured counts are integers. The exact frequency of the clock used to count is only an estimate. The measurement used is the observed number of counts, times the predicted period which is the inverse of the expected frequency.

The measurements are defined by, $TD11m = N11/freqGRhat = 3/freqGRhat$ $TD12m = N12/freqGRhat = 1/freqGRhat$ $TD21m = N21/freqGRhat = 2/FreqGRhat$.

where,

FreqGRhat=estimated GPS receiver frequency

FreqGRhat=baseGRfreq+driftGRhat

DriftGRhat=estimated frequency offset from nominal made by the GPS receiver.

The "true" time difference model defines, $TD11 = biasCS1 - biasGR1$ $TD12 = 1 - biasCS1 + biasGR2$ $TD21 = biasCS2 - biasGR2$.

The numeric index on the bias parameters represents their time-tags. The first numeric indicator on the TD is the time, the second is the source used to trigger the observation.

The first measurement to find the error model for the estimate of biasCS1 starts by defining the error to be the "true" one minus the estimated parameter.

The estimation error is defined as "errorBiasCS11", and is the estimation error of the cell-site bias in the $1^{st}$ second using the cell-site PPS as the trigger.

```
ErrorBiasCS11
    = biasCS1 = biasCS1hat
    = (TD11 + biasGR1) - (TD11m + biasGR1hat)
    = ((N11 - Q1)/freqGR + biasGR1) -
(N11/freqGRhat + biasGR1hat)
    The auxiliary variables are defined,
ErrorBiasGR = biasGR - biasGRhat
ErrorDriftGR = freqGR - freqGRhat
    = (baseGRfreq + driftGR) - (baseGRfreq + driftGRhat)
    = driftGR - driftGRhat.
Continuing,
    errorBiasCS11
    = N11 * (1/freqGR1 - 1/freqGR1hat) -
```

-continued

```
Q1/freqGR1 + errorBiasGR1
    = N11 * (freqGR1hat – freqGR1)/(freqGR1 * freqGR1hat) –
Q1/freqGR1 + errorBiasGR1
    = –N11 * errorDriftGR1/(freqGR1 * freqGRhat1) –
Q1/freqGR1 + errorBiasGR1.
Assuming Q1 equals 1, errorDriftGR equals .01, driftGR = 0,
    and baseGRfreq = 27.456 MHz, then the error is,
    errorBiasCS11 = TimeDiffTrue * (36.42191142 ns –
36.42191142 ns) – 1*36.42191142 ns
        = 36 ns
        = one clock of the master clock.
```

This is the worst-case accuracy error, which is about 10.91 meters.

The first term can be ignored because the GPS drift error is much less than the total frequency. In general, the GPS receiver can measure frequency to less than 1 Hz at L1. The error at the nominal frequency is 1/(1575.42/27.456), which equals 1/57.4 and 0.0174 Hz at baseGRfreq. Since N11 can be close to freqGR, this breaks down to 0.0174/freqGR which is 0.63 nanosecond equals 0.19 meter. Such term can be ignored when the drift error is small.

The second term is the larger error source. Worst case, Q1 is close to one clock, and Q1/baseGRfreq equals 36 nanoseconds or 10.91 meters. If both edges of the master clock are used, an accuracy of eighteen nanoseconds can be realized. Both such edges of the reference clock are used to drive the counter between the consecutive 1-PPS events. The resolution is improved and the worst-case quantization is __/baseGRfreq equals 18 ns equals 5.46 meters.

The above example gives the theoretical worst-case accuracy for TDiff based on only the frequency of the reference clock, which is 27.456 MHz.

A second measurement in the first interval provides a second estimate of the cell-site bias, but with a different GR bias,

```
ErrorBiasCS12
    = biasCS12 – biasCS12hat
    = (1 – TD12 + biasGR2) – (1 – TD12m + biasGR2hat)
    = (–(N12 + Q1)/freqGR2 + biasGR2) – (–
N12/freqGR2hat + biasGR2hat)
    = –N12 (1/freqGR2 – 1/freqGR2hat) –
Q1/freqGR2 + errorBiasGR2
    = –N12 (freqGR2hat – freqGR2)/(freqGR2 * freqGR2hat) –
Q1/freqGR2 + errorBiasGR1
    = N12 (errorDriftGR2)/(freqGR2 * freqGR2hat) –
Q1/freqGR2 + errorBiasGR2.
```

The GPS drift estimation error is small so the first term can be ignored. Two estimates are obtained for the cell-site bias in one second with different noise errors.

The estimated measurement models are, $BiasCS11hat = N11/freqGR1hat + biasGR1hat$ $BiasCS21hat = 1 - N21/freqGR2hat + biasGR2hat$ $BiasCS12hat = N12/freqGR2hat + biasGR2hat.$ Where N11, N21, and N12 are the counts from the hardware measurement and freqGRhat and biasGRhat are calculated using the GPS receiver.

The error models of the cell-site clock biases are, $ErrorBiasCS11 = -Q1/freqGR1 + errorBiasGR1 - N11(errorDriftGR1)/(freqGR1 * freqGR1hat)$ $ErrorBiasCS12 = -Q1/freqGR2 + errorBiasGR2 + N12(errorDriftGR2)/(freqGR2 * freqGR2hat)$ $ErrorBiasCS21 = -Q2/freqGR2 + errorBiasGR2 - N21(errorDriftGR2)/(freqGR2 * freqGR2hat).$ Using both edges of the 27.456 MHz GPS clock, the quantization error is a uniform random variable with a maximum error of 1/(2*27.456e6), and equals 18 ns or 5.46 m.

The GPS errors can also be modeled, $errorBiasGR = N(0, sigmaBias^2)$ $sigmaBias = TDOP * sigmaPR$ $sigmaPR = (1-2 \text{ meters})/\text{speed-of-light}$
$= 3-6 \text{ nanoseconds},$ $errorDriftGR = N(0, sigmaDrift^2)$ $sigmaDrift = TDOP * sigmaPRR$ $sigmaPRR = 0.01 \text{ m/s} = 0.003 \text{ nanoseconds/second},$ where, N(mean,variance) is a Gaussian distribution. TDOP equals time-dilution-of-precision from the least-squares solution matrix. The numbers given above for the standard deviations for the pseudo-range (PR) and pseudorange-rate (PRR) are for conventional tracking with code and carrier tracking loops.

An estimate of the cell-site clock drift can be formed using timeDiff data. Two time-difference measurements can be added together to span two external PPS events from a cell-site. The sum of these is an estimate of the time of the cell-site one-second event, $TD12 + TD21 = (1 - biasCS1 + biasGR2) + (biasCS2 - biasGR2) =$ $1 + biasCS2 - biasCS1 = 1 + biasCS1 +$ $deltaBiasCS12 - biasCS1 = 1 - driftCS12/freqCS,$ where, DriftCS12 equals drift in cell-site clock in the interval between the cell-site PPS events.

The frequency can be assumed to be constant over the interval so that freqCS1 equals freqCS2, Substituting, $TD12 + TD21 =$ $1 - driftCS12/freqCS = 1 - driftCS12/(baseCSfreq + driftCS12).$ Simplifying the derivation, TD=1−d/(base+d)

$TD*(base+d) = (base+d) - d$ $TD*(base+d) = base$ $TD*d = base(1-TD)$ $d = base(1/TD - 1).$ Expanding back to the usual notation, DriftCS12 equals baseCSfreq*(1/(TD12−TD21)−1).

Substituting the definitions of the timeDiff measurements uses the equation for the "true" driftCS, driftCS12 equals baseCSfreq*(freqGR2/(N12+N21+Q1−Q2)−1). To define the driftCS12 estimate, driftCS12hat equals baseCSfreq*(freqGR2hat/(N12+N21)−1).

In order to simplify the error in the drift estimate, return to the format of the third equation in the simplified notation above. Also multiply both sides by freqGR $$TD*(base+d)=base$$

The "true" model, $$((N12+Q1)+(N21-Q2))*(baseCSfreq+driftCS1)=baseCSfreq*freqGR2.$$

Applying the same to the measurement model (except that multiply both sides by freqGR2hat), $$(N12+N21)*(baseCSfreq+driftCS1hat)=baseCSfreq*freqGR2hat.$$

Subtracting the measurement model from the "truth" model, $$(Q1-Q2)*(baseCSfreq+driftCS1)+(N21+N21)*(driftCS1-driftCS1hat)=baseCSfreq(freqGR2-freqGR2hat)$$

Applying the following definitions, $$freqGR=baseGRfreq+driftGR$$

$$freqRhat=baseGRfreq+driftGRhat$$

$$ErrorDriftCS=driftCS-driftCShat$$

$$ErrorDriftGR=driftGR-driftGRhat,$$

$$(Q1-Q2)*(baseCSfreq+driftCS1)+(N21+N21)*(driftCS-driftCShat)=baseCSfreq*(baseGRfreq+driftGR2-baseGRfreq-driftGR2hat)$$

$$(Q1-Q2)*(baseCSfreq+driftCS1)+(N21+N21)*(errorDriftCS1)=baseCSfreq*errorDriftGR2$$

Rearranging to isolate the errorDriftCS term, $$(N21+N21)*errorDriftCS1=baseCSfreq1*errorDriftGR2-(Q1-Q2)*freqCS1.$$

The previous cell-site bias estimate is protected forward in time between the two cell-site PPS events.

A new parameter is defined that is the projection of the previous biasCS estimate with the drift estimate to generate a reference trajectory to filter the new biasCS estimate against.

The "truth" model, $$BiasCS2Minus=biasCS12-driftCS1/(baseCSfreq+driftCS1).$$

The measurement model, $$BiasCS2MinusHat=biasCS12hat-driftCS1hat/(baseCSfreq+driftCS1hat).$$

Multiplying both sides by their respective estimated cell-site total frequency, $$BiasCS2Minus*(baseCSfreq+driftCS1)=biasCS12*(baseCSfreq+driftCS1)-driftCS1$$

$$BiasCS2MinusHat*(baseCSfreg+driftCS1hat)=biasCS12hat*(baseCSfreq+driftCS1hat)-driftCS1hat$$

Forming the "true" minus the measured models, $$(BiasCS2Minus-BiasCS2MinusHat)*baseCSfreq+BiasCS2Minus*driftCS1-BiasCS2MinusHat*driftCS1hat=(biasCS12-biasCS12hat)*baseCSfreq+biasCS12*driftCS1-biasCS12hat*driftCS1hat-(driftCS1-driftCS1hat).$$

The projection error is defined as, $$ErrorBiasCS2minus \text{ equals } biasCS2minus-BiasCS2MinusHat$$

Using the convention that hat equals truth-error, $$errorBiasCS2minus*baseCSfreq+biasCS2Minus*driftCS1-$$

$$(biasCS2Minus-errorBiasCS2minus)*(driftCS1-$$

$$errorDriftCS1)=$$

$$errorBiasCS12*baseCSfreq+biasCS12*driftCS1-$$

$$(biasCS12-errorBiasCS12)*(driftCS1-errorDriftCS1)-$$

$$errorDriftCS1,$$

$$errorBiasCS2minus*baseCSfreq+errorBiasCS2minus*driftCS1+$$

$$(biasCS2Minus-errorBiasCS2minus)*errorDriftCS1=$$

$$errorBiasCS12*baseCSfreq+errorBiasCS12*driftCS1+$$

$$(biasCS12-errorBiasCS12)*errorDriftCS1-$$

$$errorDriftCS1.$$

For the convention that error equals "truth"-hat, then truth-error equals $hat\ errorBiasCS2$ $$minus*(baseCSfreq+driftCS1)+biasCS2MinusHat*errorDriftCS1=$$

$$errorBiasCS12*(baseCSfreq+driftCS1)+$$
$$biasSC12hat*errorDriftCS1-errorDriftCS1$$

$$errorBiasCS2minus*freqCS1=$$

$$errorBiasCS12*freqCS1+(biasSC12hat-$$
$$biasCS2MinusHat)*errorDriftCS1-errorDriftCS1$$

Dividing both sides by freqCS and rearranging, $$ErrorBiasCS2minus=$$

$$errorBiasCS12+(biasSC12hat-biasCS2MinusHat-1)*errorDriftCS1/freqCS1.$$

Plugging in the definition, $$BiasCS2MinusHat \text{ equals } biasCS12hat-$$

$$driftCS1hat/(baseCSfreq+driftCS1hat).$$

And rearranging, $$biasCS12hat-BiasCS2hatMinus \text{ equals}$$

$$driftCS1hat/(baseCSfreq+driftCS1hat)$$

$$ErrorBiasCS2minus=$$

$$errorBiasCS12+(-1+driftCS1hat/(baseCSfreq+driftCS1hat))*errorDriftCS1/freqCS1.$$

Simplifying the term in the brackets,
Using more simple notation: $-1+d/(b+d)$ equals $(-b-d+d)/(b+d)=-b/(b+d)$ $$errorBiasCS2minus=$$

$$errorBiasCS12-(baseCSfreq/(baseCSfreq+driftCS1hat))*errorDriftCS1/freqCS1.$$

Substituting that: baseCSfreq/(baseCSfreq+driftCS1hat)

equals $(N12+N21)/freqGR2hat$, $errorBiasCS2minus=$ $errorBiasCS12-((N12+N21)/freqGR2hat)*errorDriftCS1/freqCS1$.

Plugging in the definition of $errorBiasCS12=$ $-Q1/freqGR2+errorBiasGR2+N12(errorDriftGR2)/(freqR2*freqGR2hat)$.

Using the result in deriving the error in the drift estimate after dividing both sides by freqGR2hat, $((N21+N21)/freqGR2hat)*errorDriftCS=$ $-(Q1-Q2)*freqCS1/freqGR2hat+baseCSfreq*errorDriftGR2/freqGR2hat$.

Inserting these two equations into the working equation, $errorBiasCS2minus=-Q1/freqGR2+errorBiasGR2+N12(errorDriftGR2)/(freqGR2*freqGR2hat)+(Q1-Q2)/freqGR2hat-baseCSfreq*errorDriftGR2/(freqCS1*freqGR2hat)$, $errorBiasCS2minus=Q1*(1/freqGR2hat-1/freqGR2)-Q2/freqGRhat+errorBiasGR2+(errorDriftGR2/freqGR2hat)*(N12/freqGR2-baseCSfreq/freqCS1)$, $errorBiasCS2minus=Q1*(freqGR2-freqGR2hat)/(freqGR2hat*freqGR2)-Q2/freqGRhat+errorBiasGR2+(errorDriftGR2/freqGR2hat)*(N12/freqGR2-baseCSfreq/freqCS1)$, $errorBiasCS2minus=$
$Q1*errorFreqGR2/(freqGR2hat*freqGR2)-Q2/freqGRhat+errorBiasGR2+(errorDriftGR2/freqGR2hat)*(N12/freqGR2-baseCSfreq/freqCS1)$.

Remembering the definition that, $baseCSfreq/freqCS1$ equals $(N12+N21)/freqGR2+(Q1-Q2)/freqGR2$.

Simplifying the last term in parenthesis as, $(N12/freqGR2-baseCSfreq/freqCS1)=$ $N12/freqGR2-((N12+N21)/freqGR2+(Q1-Q2)/freqGR2)=$ $-N21/freqGR2-(Q1-Q2)/freqGR2$ $errorBiasCS2minus=$ $Q1*errorDriftGR2/(freqGR2hat*freqGR2)-$ $Q2/freqGRhat+errorBiasGR2+(errorDriftGR2/freqGR2hat)*(-N21/freqGR2-(Q1-Q2)/freqGR2)$.

$errorBiasCS2minus=$ $Q1*errorDriftGR2/(freqGR2hat*freqGR2)-$ $Q2/freqGRhat+$ $errorBiasGR2-$ $N21*errorDriftGR2/(freqGR2hat*freqGR2)-$ $(Q1-Q2)*errorDriftGR2/(freqGR2hat*freqGR2)$ $errorBiasCS2minus=$ $Q1*errorDriftGR2/(freqGR2hat*freqGR2)-$ $Q2/freqGRhat+$ $errorBiasGR2-$ $N21*errorDriftGR2/(freqGR2hat*freqGR2)-$ $(Q1-Q2)*errorDriftGR2/(freqGR2hat*freqGR2)$ $errorBiasCS2minus=$ $-Q2/freqGR2hat+$ $errorBiasGR2-$ $N21*errorDriftGR2/(freqGR2hat*freqGR2)Q2*errorDriftGR2/(freqGR2hat*freqGR2)$ $errorBiasCS2minus=$ $Q2(-freqGR2+errorDriftGR2)/(freqGR2hat*freqGR2)+$ $errorBiasGR2-$ $N21*errorDriftGR2/(freqGR2hat*freqGR2)$ $errorBiasCS2minus=$ $-Q2(freqGR2-errorDriftGR2)/(freqGR2hat*freqGR2)+$ $errorBiasGR2-$ $N21*errorDriftGR2/(freqGR2hat*freqGR2)$ $errorBiasCS2minus=$ $-Q2(freqGR2hat)/(freqGR2hat*freqGR2)+$ $errorBiasGR2-$ $N21*errorDriftGR2/(freqGR2hat*freqGR2)$ $errorBiasCS2minus=$ $-Q2/freqGR2+errorBiasGR2-N21*errorDriftGR2/(freqGR2hat*freqGR2)$ This equals the equation derived above for errorBiasCS21.

Quantization and GPS receiver errors will appear in the final filtered estimate of the cell-site. A complimentary filter is used to combine the two estimates of the same parameter into a single filtered estimate. The complimentary filter has the form, FilteredEstimate equals (1−a)*previousFilteredEstimate+a*newUnfilteredMeasurement, where a <=1.0.

If both the previous filtered estimate and the new unfiltered measurement are estimates of the same parameter, then the filtered estimate is unbiased, $$FilteredEstimate \text{ equals } (1-a)*(X+N1)+a*(X+N2) =$$
$$((1-a+a)*X)+(a*N2+(1-a)*N1)) =$$
$$X+((1-a)*N1+a*N2).$$

If the gain parameter "a" is small, then the noise on the previous filtered estimate is preferably not filtered. If there is an error in the propagation from a previous time to a current time, the error is placed directly into the filtered estimate.

An optimal filter has a gain of 0.5 when the propagation error is on the same order of magnitude as the noise in a new raw measurement. In this way, some attenuation of the propagation error is obtained.

Applying the complimentary filter, BiasCS12filtered=(1−a)*biasCS12minusHat+a*biasCS12hat. The error then has the form, Error=(1−a)*(error in biasCS12minusHat)+a*(error in biasCS12hat).

It is not possible to reduce any of the error sources because the predicted bias is equal to the measured quantity and the error in both terms is the same.

An earlier estimate of the cell-site bias can be used other than that allowed by the GPS observation. Variable errorBiasCS11 is used instead of errorBiasCS12.

Starting with the "truth" model, BiasCS2Minus=biasCS11−driftCS1/(baseCSfreq+driftCS1).

The measurement model, BiasCS2MinusHat=biasCS11hat−driftCS1hat/(baseCSfreq+driftCS1hat).

Arriving at,

*errorBiasCS2minus=* errorBiasCS11−(*baseCSfreq/(baseCSfreq+driftCS1hat*

))**errorDriftCS1/freqCS1*.

Substituting that,

*baseCSfreq/(baseCSfreq+driftCS1hat)* equals (*N12+N21*)*/freqGR2hat*,

*errorBiasCS2minus=errorBiasCS12−((N12+N21)/freqGR2hat*

)**errorDriftCS/freqCS1*.

Plugging in the result,

*errorBiasCS11=−*

*Q1/freqGR1+errorBiasGR1−N11(errorDriftGR1)/(freqGR*

1**freqGR1hat*).

And using the result to derive the error in the drift estimate after dividing both sides by freqGR2hat, ((*N21+N21*)*/freqGR2hat)\*errorDriftCS=*

−(*Q1−Q2*)**freqCS1/freqGR2hat+baseCSfreq\*errorDriftGR2/ freqGR2hat.*

Inserting these two equations into the working equation,

*errorBiasCS2minus=−Q1/freqGR1+errorBiasGR1−N*

11(*errorDriftGR1*)/(*freqGR1\*freqGR1hat*)+(*Q1−*

*Q2*)*/freqGR2hat−baseCSfreq\*errorDriftGR2/(freqCS*

1**freqGR2hat*),

*errorBiasCS2minus=Q1\*(1/freqGR2hat−1/freqGR1*)−

*Q2/freqGR2hat+errorBiasGR1−N11*(*errorDriftGR1*)/(*freqGR*

1**freqGR1hat*)*−baseCSfreq\*errorDriftGR2/(freqCS\*freqGR2hat*),

*errorBiasCS2minus=Q1\*(freqGR1−freqGR2hat)/(fregGR2* hat**freqGR1*)*−Q2/freqGR2hat+errorBiasGR1−N*

11(*errorDriftGR1*)/(*freqGR1\*freqGR1hat*)− baseCSfreq**errorDriftGR2/(freqCS1\*freqGR2hat*),

*errorBiasCS2minus=Q1\*(freqGR1−*

*freqGR2+errorDriftGR2)/(freqGR2hat\*freqGR1*)−

*Q2/freqGR2hat+errorBiasGR1−N11*(*errorDriftGR1*)/(*freqGR*

1**freqGR1hat*)*−baseCSfreq\*errorDriftGR2/(freqCS1\*freqGR2hat*).

Thus, the difference of biasCS2hat−biasCS2minusHat,

*ErrorBiasCS21−errorBiasCS2minus=*

−*Q2/freqGR2+errorBiasGR2−N21*(*errorDriftGR2*)/(*freqGR2\** freqGR2*hat*)−*Q1\*(freqGR1−*

*freqGR2+errorDriftGR2)/(freqGR2hat\*freqGR1*)+

*Q2/freqGR2hat−errorBiasGR1+N11*(*errorDriftGR1*)/(*freqGR*

1**freqGR1hat*)+*baseCSfreq\*errorDriftGR2/(freqCS*

1**freqGR2hat*))=*Q2\*(1/freqGR2hat−1/freqGR2*)−

*Q1\*(baseGRfreq+driftGR1−baseGRfreq−* driftGR2+*errorDriftGR2*)/(*freqGR2hat\*freqGR1*)+

*errorBiasGR2−errorBiasGR1+*

*N11*(*errorDriftGR1*)/(*freqGR1\*freqGR1hat*)−

*N21*(*errorDriftGR2*)/(*freqGR2\*freqGR2hat*)+ baseCSfreq**errorDriftGR2/(freqCS1\*freqGR2hat*)=

*Q2\*errorDriftGR2/(freqGR2hat\*freqGR1*)−

*Q1\*(driftGR1−driftGR2+errorDriftGR2)/(freqGR2* hat**freqGR1*)+*errorBiasGR2−errorBiasGR1+*

*N11*(*errorDriftGR1*)/(*freqGR1\*freqGR1hat*)−

*N21*(*errorDriftGR2*)/(*freqGR2\*freqGR2hat*)+ baseCSfreq**errorDriftGR2/(freqCS1\*freqGR2hat*).

It appears that this may actually be smaller than the error derived earlier. However, this result is inconclusive and needs more investigation.

Counting the number of clock pulses from the clock with unknown frequency error in a known time interval generated by the reference clock, forms the freqDiff observable. The frequency is computed as the number of clocks divided by the "true" time interval. Even though there is enough information to make this estimation with the timeDiff measurement data, it turns out that the error in the estimate is perfectly correlated with the bias estimates. The same observations, with their associated quantization sources, are used in estimating the bias and drift. Thus, freqDiff is used to form an estimate of drift that is statistically independent from the bias estimates.

Embodiments of the present invention count the clock pulses with unknown frequency error directly. In contrast, the timeDiff circuits count pulses from the reference clock.

The quantization error is a uniform random variable between (0,1) and it is not zero mean. To reduce the parameter, the data must be pre-whitened to produce a zero-mean measurement error, and conventional techniques can be used in parameter estimating with a quantized noise souce.

Once the noise souce becomes a zero-mean process, it may be reduceable with good filtering. However, in estimating a parameter that has a non-constant slope, the previous filtered bias must be propagated to the current time. This is needed to assimilate the new measurement with the previous data in an unbiased manner. The difference between the average bias and the new data is scaled and then added to the propagated estimate to finish the update.

The 1$^{st}$ order low-pass filter, $$Bfiltered(K) \text{ equals } PropagatedBias(K)+gain$$

$$(K)*(biasMeas(K)-PropagatedBias(K)),$$

where,

PropagatedBias(K) equals Bfiltered(K−1)−drift(K)*deltaTime(K)

gain(K) equals 1/m, where
  m equals k if k<Kmax
  m equals Kmax if k>Kmax
  deltaTime(K) equals time between t=K and t=K−1.

Note, if Kmax equals infinity, then the filter output is the average of all the data.

The propagation error from the timeDiff based-drift estimate has the same error as the new measurement. The propagation error is not filtered, and cannot use the timeDiff based-drift estimate in the projection phase.

Embodiments of the present invention directly count the unknown frequency error clock pulses. The timeDiff circuit count pulses from the reference clock.

The freqDiff measurement is the number of external clocks counted in an interval defined with an integer number of internal clocks. An estimate of frequency offset of the internal clock can measure the frequency of the external clock.

The "true" measurement is, ClockCount equals freqCS*DeltaTimeTrue.

The observed count will be in error by the effects of the quantization of the external clock against the internal master clock at the time the count is started and finished.

Figure 6:
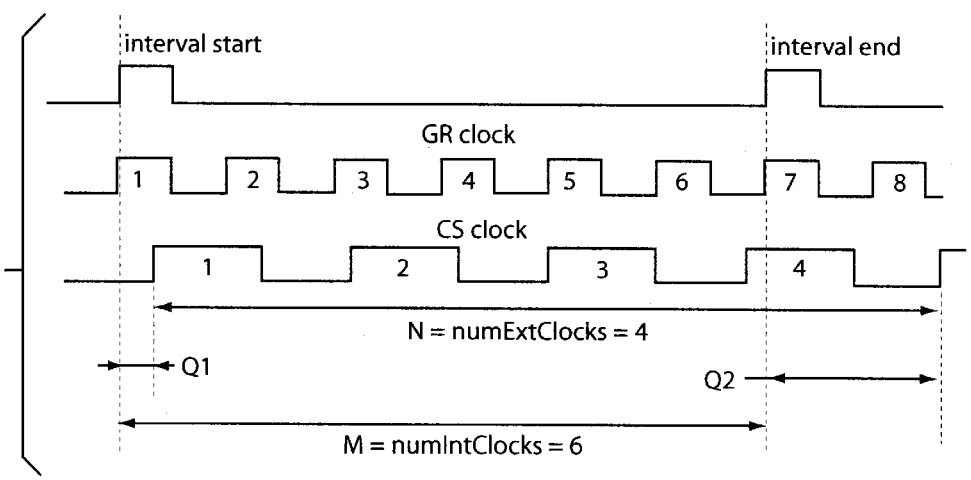
FIG. 6 is a diagram representing a quantization of external cell-site clocks in a freqDiff observation.

The observation model can be derived from FIG. 6, in which the circuit counts four external clocks. However, the real number is a number that contains a fractional component equal to (Q1−Q2) where Q1 and Q2 have units of counts and are continuous random variables between 0 and 1 count.

The "true" integer plus fractional number of counts, ClockCountTrue equals freqCS*DeltaTimeTrue=N+(Q1−Q2).

The count observed by the circuit is only N counts.

The "true" time difference is the number of internal master clocks in the interval times the "true" period of the clock.

$$DeltaTimeTrue \text{ equals } M*trueperiod=M/freqGR.$$

Thus have:

$$N+(Q1-Q2) \text{ equals } freqCS*M/freqGR \qquad (\text{eq A.}).$$

Re-arranging, $$(N/M)*(baseGR+driftGR) \text{ equals } (Q2-Q$$

$$1)*(baseGR+driftGR)/M+baseCS+driftCS.$$

$$(N/M)*baseGR-baseCS \text{ equals } (1/M)*(Q2-Q$$

$$1)*baseGR+driftCS-$$

$$driftGR*(1/M)*(-(Q2-Q1)+N).$$

The term in the brackets can be replaced by manipulating eqA.

$$(N+(Q1-Q2))/M \text{ equals } freqCS/freqGR.$$

Thus, $$(N/M)*baseGR-baseCS=$$

$$(1/M)*(Q2-Q1)*baseGR+$$

$$driftCS-driftGR*(freqCS/freqGR)=$$

$$driftCS-driftGR*(freqCS/freqGR)+(1/M)*(Q2-Q1)*baseGR.$$

The scale factor in the first term on the left side of the equation (baseGR/M) is the approximation of the deltaTime based on the nominal GPS receiver frequency. Thus, this term is the estimate of the total cell-site frequency. By subtracting the nominal cell-site frequency from the total frequency estimate, the difference represents the difference in the frequency offset of the two clocks. The left hand side represents the manipulation of the measurement data that produces the frequency difference wanted. The error in the frequency estimate is due to the lost fractional cycles over the time interval. The error is reduced by either increasing the cell-site frequency (increasing baseCS which decreases Q1 and Q2), or increasing the time interval (by increasing M). The scale factor on the GPS receiver drift term (freqCS/freqGR) produces the translation of the GPS receiver clock frequency from its reference frequency into the reference frequency of the cell-site.

The freqDiff measurement N is defined as shown below, $$\Delta F \text{ equals } (N/M)*baseGR-baseCS \text{ (units are counts at}$$

$$baseCSfreq) \text{ error equals } (1/M)*(Q2-Q1)*baseGR.$$

Applying this change of variables, $$DriftCS \text{ equals } \Delta F+driftGR*(baseCS+driftCS)/(baseGR+driftGR)-error.$$

Expanding, $$DriftCS*(1-driftGR/(baseGR+driftGR))=$$

$$\Delta F+driftGR*baseCS/(baseGR+driftGR)-error.$$

Expanding of the left, $$DriftCS*((baseGR+driftGR-driftGR)/(baseGR+driftGR))=$$

$$\Delta F+driftGR*baseCS/(baseGR+driftGR)-error.$$

And reducing, $$DriftCS*baseGR/(baseGR+driftGR)=$$

$$\Delta F+driftGR*baseCS/(baseGR+driftGR)-error.$$

Finally, solve for the cell-site drift and re-insert the error term, $$DriftCS \text{ equals } \Delta F*freqGR/baseGR+driftGR*baseCS/baseGR+$$

$$(1/M)*(Q1-Q2)*freqGR$$

Using known parameters, the final cell-site drift estimate, $$DriftCShat \text{ equals } \Delta F*freqGRhat/baseGR+driftGRhat*baseCS/baseGR.$$

Where $\Delta F$ equals $(N/M)*baseGR-baseCS$.

In the cell-site drift estimate accuracy the difference between the "true" and measured cell-site drift is $$errorDriftCS=errorDriftGR*\Delta F/baseGR+errorDriftGR*baseCS/baseGR+$$

$$(1/M)*(Q1-Q2)*freqGR.$$

Inserting the definition of the $\Delta F$, $$ErrorDriftCS=$$

$$errorDriftGR*(1/baseGR)*(N/M*baseGR-baseCS+baseCS)+$$

$$(1/M)*(Q1-Q2)*freqGR=$$

$$errorDriftGR*(1/baseGR)*(N/M*baseGR)+$$

$$(1/M)*(Q1-Q2))*freqGR=$$

$$errorDriftGR*N/M+(Q1-Q2)/M*freqGR=$$

$$errorDriftGR*N/M+((Q1-Q2)/M)*freqGR.$$

Thus, $$ErrorDriftCS \text{ equals } ((Q1-Q2)/M)*freqGR+(N/M)*errorDriftGR.$$

The longer the integration time, the more the error in estimating the "true" time interval grows because of integrating the GPS drift error term errorDriftGR. The quantization error is the sum of two uniform random variables.

It is the period of the clock used to count the frequency difference that determines the worst case frequency error. The higher the frequency, the smaller the period and the quantization term. Alternatively, one can use a longer observation period. Such may be a problem if the clock operates in an environment of some observable temperature change. This may cause the clock to change frequency, and can lead to non-linear changes. The average frequency will be less accurate than the quantized estimate.

If the external clock frequency is lower that the internal clock frequency, the driftCS estimate from the timeDiff measurement is used to estimate the cell-site frequency offset. However, if the external frequency is higher than the internal clock frequency, then the freqDiff observation is used instead.

In cases where only frequency synchronization is possible, because a system 1PPS does not exist, then the freqDiff counter will be used to estimate the external clock frequency as the timeDiff will not provide any information about the external clock when the external PPS is not available.

For a device that communicates with a network infrastructure and a GPS receiver, both receivers will track the carrier frequency of their respective transmitters. For GPS, the receiver also tracks the phase of the pseudorandom code allowing a pseudorange measurement to be produced. The measurement is a time difference of arrival measurement, as the time of transmission is known, and the receiver records the time of arrival with respect to its local clock.

The GPS satellite (SV) has a time and frequency error from "true" GPS time and the "true" desired reference frequency of the spacecraft clock.

$$FreqSV \text{ equals } baseSVfreq+driftSV.$$

$$TimeSV \text{ equals } timeGPS+biasSV.$$

The GPS receiver (GR) also has a time and frequency error from GPS time.

$$FreqGR \text{ equals } baseGRfreq+driftGR.$$

$$TimeGR \text{ equals } timeGPS+biasGR$$

A cell-site system (CSS) with a reference time for all its cell-sites uses cell-site-system time or timeCSS. Such time reference is different from GPS time. It is also possible that the cell-sites are not synchronized to a common time. Embodiments of the present invention do not require that any of the cell-sites have the same time reference.

"FreqCS" equals baseCSfreq+driftCS. "TimeCS" equals timeCSS+biasCSS (with respect to cell-site System time). It also equals timeCSG+biasCSG (with respect to GPS time).

Each cell-site has an offset from timeCSS that is the biasCSS. We can also reference timeCSS to GPS time. The time error for the cell-site changes to biasCSG. The cell-phone also has a frequency offset from its nominal frequency referred to as driftCP.

$$FreqCP=baseCPfreq+driftCP$$

$$TimeCP=timeCPS+biasCPS=timeCPG+biasCPG.$$

There are two cell-phone methods for tracking the cell-site frequency, the NCO method or the VCO method. In an NCO method embodiment of the present invention, the cell-phone reference frequency is held constant and the additional frequency required to track the cell-site is made in an additional oscillator or NCO. The circuit that produces this additional frequency will generally have a software counter that integrates all the frequency adjustments to produce a number that represents the offset from nominal frequency needed to track the cell-site frequency. Such frequency offset is the driven by three processes, (1) the cell-phone offset from its nominal frequency, (2) the Doppler between the cell-phone and the cell-site caused by the projection of the cell-phone user dynamics along the line-of-sight between the cell-phone and the cell-site, and (3) the frequency offset of the cell-site from its nominal frequency.

The cell-phone outputs a message that contains a total frequency offset number and an associated time tag. Such number is used with the freqDiff and timeDiff observations to synchronize the cell-phone to the GPS receiver clock.

In the VCO method embodiment of the present invention, a cell-site carrier is tracked by adjusting the reference frequency directly with a VCO. The voltage is changed to the circuit that produces the different mixdown frequencies. The NCO is not needed. If the adjusted reference clock is directly observed with the timeDiff and freqDiff observations, then there is no need for the cell-phone to send any additional information. Any cell-phone bias is replaced by a cell-site range and bias, and any cell-phone drift becomes the rangeRate and cell-site drift.

The tempMeas observable is very similar to the freqDiff. The navigation digital-signal processor preferably includes an oscillator whose frequency is determined by an RC-time constant in which the resistor is actually a thermistor. The tempMeas circuit counts the number of cycles of the oscillator in a predetermined interval and gets a measure of temperature from a thermistor calibration curve.

The GPS clock naturally drifts with temperature. Thus, during a calibration phase when the temperature of the complete navigation digital-signal processor based GPS receiver, observe that the count and the GPS receiver clock drift (driftGR2hat) is swept at the same time. A model is built that allows the GPS clock drift to be predicted from the tempMeas.

The aging of the clock and the crystal imperfections will cause deviations of the crystal frequency from the model. And the intrinsic variations in the crystal act to limit the accuracy of the estimator.

The hardware to implement the tempMeas is simply a counter that starts on a GPS predetermined millisecond and ends after a predetermined number of milliseconds later.

While sweeping over the industrial temperature range in the factory (and in the field whenever obtain a reliable GPS fix), observe tempMeas and the driftGR2hat and build the model (and update model in the field) of the driftGR2hat verses the counter value. A tempMeas can then be performed at any time and using this model, an estimate of the GPS receiver clock drift can be obtained. This estimate is called driftGR2HatSCXO. The acronym SCXO comes from Software-Compensated-Crystal-Oscillator.

In the cell-phone, a tempMeas at startup to form driftGR2hat is made. Such estimate will be used during the time and frequency transfer (from the phone to the cell-phone) to reduce the required GPS search range and thus, enable a super-thin GPS client.

The components of the dual mode system are a GPS satellite, the GPS receiver, the cell-site, and the cell-phone.

A GPS satellite is being tracked by a GPS receiver at the cell-site whose purpose is to observe the offset of the cell-site clock from GPS time and its frequency reference. This receiver and cell-site have known locations and are static. They are physically close enough to allow the physical connection needed to make the timeDiff and freqDiff observations.

The second GPS receiver is at the cell-phone location. The goal is to estimate the location (position and velocity) of the cell-phone. All possible measurement sources to do this. The normal GPS pseudorange and pseudorange-rate measurements are used to compute the position, time, and frequency of the GPS receiver at the cell site. Such allows the GPS receiver to synchronize to GPS time, and thus, by observing the relative offset between the cell-site and the GPS receiver time and frequency, can calculate the time and frequency offset of the cell-site from GPS time.

In cell-phone embodiments of the present invention, the inverse is done. The cell-phone is assumed to be tracking the cell-site frequency and time. Pseudorange and pseudorange-rate measurements can also be formed for the signal between the cell-phone and the cell-site. Because the cell-site position is known, the cell-site can be used as a ranging source in the same way a GPS satellite is used.

Since the cell-phone is tracking the cell-site, and the frequency required to track is known, the use of freqDiff allows two things. The pseudorange and pseudorange-rate between the cell-phone and the cell-site can be used as estimates of the cell-phone time and frequency error. Estimates can be made about the GPS receiver's time and frequency using the timeDiff and freqDiff observations, and greatly reduce the search range for the GPS satellites. It can also be used to improve acquisition time and/or acquisition sensitivity. The cell system aids the GPS to acquire satellites.

After at least one GPS satellite is acquired, the pseudorange and pseudorange-rate between the cell-phone and the cell-site are used along with the GPS pseudoranges and pseudorange-rates in the position calculation. Because of the timeDiff and freqDiff observations, the cell-site time and drift can be expressed in terms of the GPS bias and drift, and the number of unknowns is reduced to the normal unknown as in the stand-alone GPS case.

Figure 7:
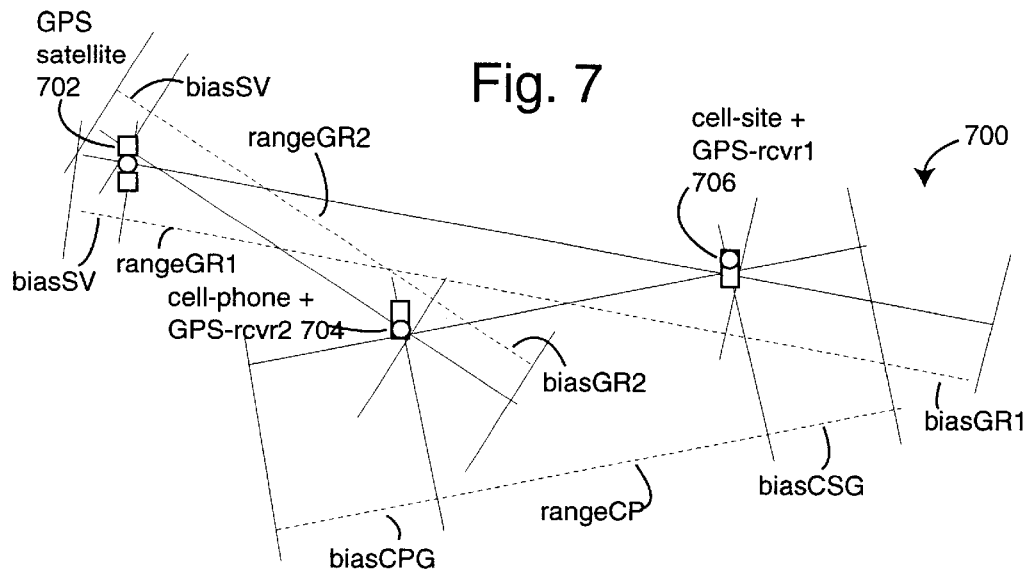
FIG. 7 is a diagram representing the physical geometry of a GPS satellite, cell-site, and cell-phone, and how timing/frequency biases can affect position information.

FIG. 7 represents a dual-mode system 700 with GPS receiver tracking a satellite vehicle (SV) 702 and a cell-phone 704 tracking a cell-site 706. The clocks in the system with respect to the dual-mode system are, SV clock*(numSatellites), GPS receiver-1 clock in the cell-site, GPS receiver-2 clock in the cell-phone, Cell-site clock*(numCellSites), Cell-phone clock For example, if there are five GPS satellites, and five cell-sites, then the total number of clocks in the system, nmSatellites+numCellSites+3=5+5+3=13. For each cell-site and GPS satellite, a pseudorange (PR) and pseudorange-rate measurement (PRR) can be formed.

For a system with one GPS satellite 702 and one cell-site 706, the calibration begins by making a passive connection between a cell-site 706 and cell-phone 704. A cell-site clock signal and its 1-PPS can be observed by GPS receiver-1 706. These signals are connected to the freqDiff and timeDiff circuits of a navigation digital-signal processor respectively. The cell-phone clock signal and its 1-PPS can be observed by the GPS receiver-2 704. Such also has a navigation digital-signal processor chip and such signals are connected to the freqDiff and timeDiff circuits of navigation digital-signal processor respectively.

Figure 8:
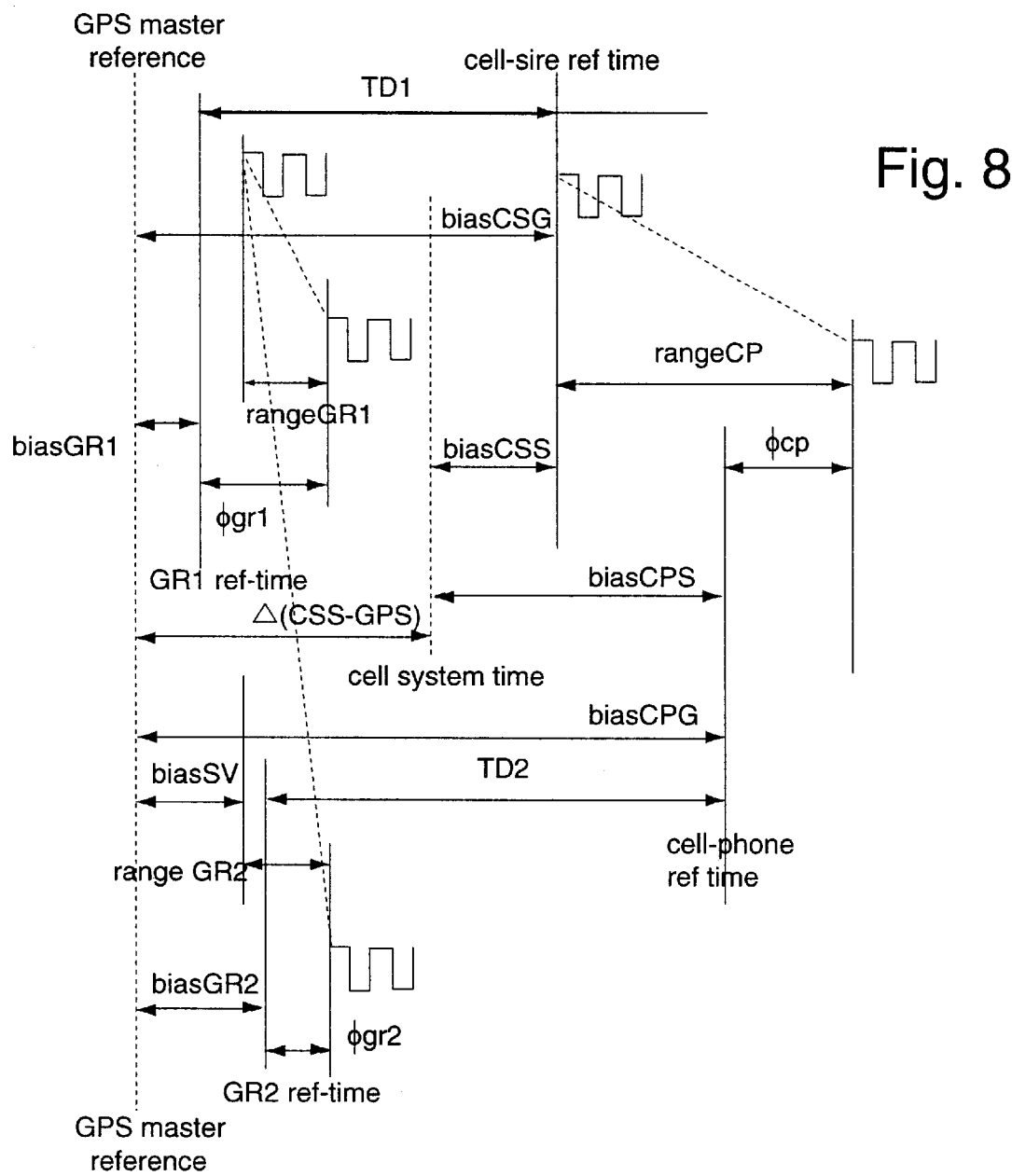
FIG. 8 is a timing diagram that represents each clock with its own system time and a corresponding clock bias from this time, the sum of these two produce a reference time used for making observations in a receiver, and the time-difference observations are taken in between these time-references.

FIG. 8 represents each clock with its own system time and a corresponding clock bias from this time. The sum of these two, e.g., the system time plus the bias, produce the reference time used by the hardware for making observations in the receiver. The time-difference observations are taken between these time-references. The first one, TD1, is between GPS receiver-1 and the cell-site. The second one TD2 is between GPS receiver-2 and the cell-phone. The clock pulse signals represent a timing signal leaving the transmitter at a known time and arriving at the receiver later in time according to the range. However, the time bias errors cause the observed phase measurement to be affected, e.g., by the bias error of both the transmitter and receiver. Such observations become the pseudoranges.

TD1 is the timeDiff measurement between the 1-PPS of the GPS receiver-1 and the 1-PPS of the cell-site. Such produces the observation N12 and N21 in units of counts from the receiver-1 and can be used to form timeDiff TD1 in units of seconds.

TD2 is the timeDiff measurement between the 1-PPS of the GPS receiver-1 and the 1-PPS of the cell-site. Such produces the observation N12 and N21 in units of counts from the receiver-2 and can be used to form timeDiff TD1 in units of seconds.

From FIG. 8, it can be seen that, $$\text{BiasGR1+TD1=biasCSS+}\Delta\text{(CSS-GPS)=biasCSG, (units are seconds)}$$

$$\text{BiasGR2+TD2=biasCPS+}\Delta\text{(CSS-GPS)=biasCPG.}$$

The units of measure for the pseudorange measurements are preferably maintained in units of seconds rather meters, in order to simplify things in terms of the timeDiff and freqDiff. But the units in meters can be used too.

Two measurements are obtained from the timeDiff circuit each second. They are Ni1 and Ni2, where I=time marker, and "1" is the measurement from the external PPS and "2" is the measurement from the internal PPS.

The phase measurement that was produced to make the local phase of the signal-generated in the cell-phone track the received phase of the signal transmitted by the cell-site can be accessed.

From FIG. 8, the observed phase measurement is such that, $$BiasCS+rangeCP=BiasCP+\phi cp.\text{(units are seconds)}$$

Re-arranging this yields, $$\phi cp=rangeCP+BiasCS-BiasCP.$$

$$TD1=biasCSG-BiasGR1,$$

$$TD2=biasCPG-BiasGR2$$

The analogous measurement from the GPS receiver is such that, $$biasSV+rangeGR2=biasGR2+\phi GR2,$$

$$biasSV+rangeGR1=biasGR1+\phi GR1.$$

Re-arranging gives, $$\phi GR1=rangeGR1+biasSV-biasGR1,$$

$$\phi GR2=rangeGR2+biasSV-biasGR2.$$

The "true" positions can then be found. A three-dimensional earth-centered-earth-fixed (ECEF) Cartesian coordinate, e.g., WGS-84, is used. A cell-site position and velocity is considered to be known, $$PosCS(\text{in meters})=(xCS, yCS, zCS),$$

$$VelCS(\text{in m/s})=(xVelCS, yVelCS, zVelCS)=0.$$

The GPS receiver-1 at the cell-site has a known position that is near the cell-site position, but does not need to be identical to it. Thus, posGPS1=(x1, y1, z1), and velGPS1=(xVel1, yVel1, zVel1)=0.

The GPS satellite position is assumed to be known from the ephemeris model that is distributed around the system. The satellite velocity is calculated from the ephemeris. PosSV=(xSV, ySV, zSV), VelSV=(xVelSV, yVelSV, zVelSV).

The GPS receiver-2 has a cell-phone and its loaction represents the main unknown in the system. All the other unknowns are nuisance parameters in the system that need to be solved or eliminated.

The cell-site and GPS receiver are defined to be at the same (unknown) location. So, posGPS2=posCP=(x, y, z), and vel1GPS2=vel1CP=(xVel, yVel, zVel).

In the "true" range definitions, the coordinate frame is orthonormal. The positive distance between any two points is the magnitude of the vector between the two points. The range equations can be expresses in terms of seconds.

$$RangeGr1=k*((xSV-x1)^2+(ySV-y1)^2+(zSV-z1)^2)^{1/2}.$$

$$RangeGR2=k*((xSV-x)^2+(ySV-y)^2+(zSV-)^2)^{1/2}.$$

$$RangeCP=k*((xCP-x)^2+(yCP-y)^2+(zCP-z)^2)^{1/2}.$$

Where, K=the inverse of the speed of light, e.g., 2.99792458e8 meters/second.

FIG. 9 is a visualization of how the freqDiff measurement can be taken and used. A freqDiff1 measurement is obtained between GPS receiver-1 reference and the cell-site reference. The freqDiff2 measurement is obtained between GPS receiver-2 reference and the cell-phone reference. The same reference, e.g., the nominal frequency used in the GPS receiver, is used for both the GPS receivers. Part of the strategy is to employ the same hardware solution that contains the navigation digital-signal processor chip at both the reference stations for DGPS and data, cell-sites, and client (cell-phone) solutions. Thus, the same frequency reference can be assumed, which is the nominal crystal frequency used to generate all the frequencies used to track the GPS satellite carrier.

For the cell-system side, it is convenient to use a common frequency reference when calculating the frequency offset from systems with different nominal frequencies. However, the same modeling can be used in either case. All the nominal frequencies need to be scaled to one master frequency. Then the frequency offset is translated from its nominal frequency to the new master frequency by multiplying the offset by the ratio, otherRefFreq/nominalRefFreq. An algebra can be performed with proper scaling. The result is converted back to the nominal reference with the inverse scaling.

The range-rate measurements are not included in the freqDiff figure, the pseudoranges are in the timeDiff figure. The user motion and satellite are usually expressed at the GPS carrier frequency (L1=1575.42 MHz). The freqDiff observations are not affected by the user or satellite motion. Such applies to the NCO for the cell-phone frequency generation. In the VCO method embodiment of the present invention, the range and cell-site clock effects do appear in the cell-phone reference frequency.

The raw measurement from the freqDiff circuit are the counts N1 from GPS receiver-1 and N2 from GPS receiver-2. The freqDiff in units of cycles/sec at the cell-site reference frequency can be computed with these. BaseCS=baseCP can be assumed.

$$\Delta F1=(N1/M)*baseGR-baseCS \text{ (Hz at}$$

$$baseCSfreq)$$

$$\Delta F2=(N2/M)*baseGR-baseCP \text{ (Hz at}$$

$$baseCPfreq)$$

where,

N1=freqDiff in counts from navigation digital-signal processor1

N2=freqDiff in counts from navigation digital-signal processor2.

An estimate of frequency from the cell-phone is required to track the cell-site carrier. The method embodiment of the present invention is used with an NCO. The cell-phone can output a number that can be scaled into units of cycles/sec at the baseCP frequency.

The measurement from the cell-phone carrier tracking loop, $$\phi DotCP=rangeRateCP+driftCS-driftCP$$

(Hz at $baseCSfreq$)

In another embodiment, the VCO is steered to track the cell-site carrier and the effect on the cell-phone nominal frequency is observed directly in the timeDiff and freqDiff circuit. It is still possible that the numerical representation of the frequency offset from nominal can be output. However, there is a different meaning of the frequency component due to the cell-phone clock that appears in freqDiff. Now the freqDiff will observe the Doppler component of the cell-phone motion and the frequency offset of the cell-site.

If the transmitter has a positive frequency offset, then the receiver must increase its generated frequency to track this addition frequency offset from nominal. If the receiver has a positive frequency offset, then it must reduce its generated frequency to track the carrier. Finally, if there is a positive Doppler between the transmitter and receiver, then the receiver must increase its frequency to track this effect.

Tracking the carrier of the cell-site, the frequency produced to allow tracking, $$FreqCPvco =$$
$$freqCP(\text{at turn on}) + (rangeRateCP + driftCS - driftsCP) =$$
$$baseCPfreq + driftCP + (rangeRateCP + driftCS - driftsCP) =$$
$$baseCPfreq + (rangeRateCP + driftCS) =$$
$$baseCPfreq + driftCPvco,$$

where, when tracking the cell-site, DriftCPvco= rangeRateCP+driftCS.

The phase error discriminator that produces the updates to the VCO frequency must remove the drift of the cell-phone.

Examining the effect on the freqDiff observation, the counter will observe the integer number of cycles of the frequency freqCPvco to track the cell-site, rather than just the cell-phone frequency freqCP.

In other words, ClockCountTrue= freqCSvco*deltaTimeTrue=Nvco+(Q1−Q2).

Thus, when equating the observation to the unknowns, define, $$FreqDiffVCO = driftCPvco - driftGR * (freqCS / freqGR) =$$
$$(rangeRateCP + driftCS) - driftGR * (freqCS / freqGR)$$

The GPS receiver can make a measurement of the pseudorange-rate from the frequency offset it generates in an numerically controlled oscillator that provides an additional frequency offset from the reference frequency (freqCS= baseGRfreq+driftGR). The measurement can be modeled as the derivative of the pseudorange.

A "Dot" after φ indicates the derivative.

$$\phi DotGR1 = rangeRateGR1 + driftSV - driftGR1;$$
$$\phi DotGR2 = rangeRateGR2 + driftSV - driftGR2.$$

Removing unknowns for the freqDiff and pseudorange-rates, driftSV is assumed to be known from the ephemeris data that is distributed around the system. The cell-site is known to be static, and rangeRateGR1 can be computed using, $$RangeRateGR1 = (xVelSV - xVl)*uX + ($$
$$yVelS - yVel)*uY + (zVelSV - zVl)*uZ$$

where,
uX=(xSV−x1)/rangeGR1
uY=(ySV−y1)/rangeGR1
uZ=(zSV−z1)/rangeGR1 and
"true" user velocity vector=(xVe1, yVe1, zVe1)

The GPS receiver at the cell-site can be assumed to have a "true" user velocity of zero. Thus, all the positions and velocities are assumed known. The GPS receiver 112 at the cell-site can compute its position, or the position can be a surveyed position. Secondly, the satellite position and velocity can be computed with the ephemeris made available to the cell-site GPS receiver.

Because RangeRateGR1 and driftSV are known, can use the observed pseudorange-rate can be used to estimate the GPS receiver drift.

Thus, the estimate of the drift at GPS receiver-1 can be computed.

$$driftGR1hat = rangeRateGR1 + driftSV - \phi DotGR1 \text{(units are}$$
$$\text{Hz at } baseGRfreq).$$

If more satellites are being tracked, then the drift estimate can be formed from the velocity fix, or by averaging a set of the above equations if the position is known. Such will improve the accuracy of the estimate if the position accuracy is high.

Using the freqDiff and the estimated GPS receiver-1 clock drift, the estimate of the cell-site clock drift can be formed.

$$DriftCShat = \Delta F1 * freqGR1hat/baseGR + driftGR1$$
$$hat*baseCS/baseGR \text{ (units are HZ at } baseCSfreq)$$

where,
ΔF1=(N1/M)*baseGR−baseCS
freqGRhat1=baseGRhat+driftGR1hat (from the GPS receiver-1)
N1=freqDiff between cell-site and GPS receiver-1.

Remove the cell-phone clock drift to compute velocity with method embodiment of the present invention.

When the cell-phone is tracking frequency with an NCO, freqDiff can be used to express the cell-site drift in terms of the GPS receiver drift. This removes the cell-phone clock from the measured cell-phone carrier frequency to track the cell-site carrier.

Remember:

$$\Delta F2 = (N2/M) * baseGRfreq - baseCPfreq =$$
$$driftCP - driftGR2 * (baseCSfreq/baseGRfreq).$$

Thus, $$DriftCPhat = \Delta F2 + driftGR2 * (baseCSfreq/baseGRfreq)$$

The carrier measurement can be used as an estimate of driftCP:

$$\phi DotCP = rangeRateCP + driftsCShat - (\Delta F2 + driftGR2 * ($$
$$baseCSfreq/baseGRfreq))(\text{Hz at } baseCSfreq).$$

Thus, this is an expression for the pseudorange-rate where the unknown are in terms of velocity and clock bias of the GPS receiver.

Remove the cell-phone clock drift to predict the drift of the GPS receiver in the cell-phone.

Before fixing, this procedure can be used to generate an estimate of the clock drift of the GPS receiver clock in the cell-phone.

An estimate of the drift can be formed by assuming that the cell-phone is static, so that the rangeRateCP term can be assumed to be zero. The accuracy of the estimate is driven by the accuracy of this assumption. However, for most low cost clocks, the frequency uncertainty caused by temperature and aging on the crystal are much larger than the user dynamics between the cell-phone and cell-site, and the estimate provides a huge information gain that can be used to reduce search time and or increase sensitivity.

For example, suppose the user is moving at 100 mph. We first convert the user velocity to meters/second:

(100 miles/hour)*(1-hour/3600 seconds)*(5280 feet/1-mile)

*(12 inches/1 foot)*(0.0254 meters/1-inch)=44.704 meters/second

Now, for this example, assume the nominal frequency of the GPS receiver at the cell-phone clock if 27.456 MHz.

The wavelength of the,

λCP=C/f=speed-of-light/27.456e6 cycle/sec=10.9 meters/cycle.

The frequency Error of driftCP assuming the user is static when in fact the user is moving at 100 mph, freqError (Hz at nominal GR freq)=(44.704 meters/second)*(1-cycle of baseCPfreq/10.9 meters)=4.1 Hz.

The freqError in Parts-Per-Million (PPM),

FreqError(PPM)=4.1/27.456=0.15 PPM.

The effect on the velocity solution is that this frequency error is multiplied up to L1 whose wavelength=0.19 meters/cycle.
Thus, Frequency Error at L1=(44.704 meters/second)*(1-cycle of L1/0.19 meters)=235 Hz.

The PPM remains the same at any reference frequency. The freqError in Parts-Per-Million (PPM), 235 Hz/1575.42= 0.15 PPM The frequency error of the crystal may be on the order of 0.5 to 1 PPM, and the assumption of zero-user-velocity still provides a big information gain in estimating the GPS receiver frequency drift. The information gain for a 1-PPM uncertainty is 1/0.15=6.7. This means the frequency search can be reduced by a factor of 6.69. Such provides a major reduction in search time.

Assuming the user dynamics are zero, first make an estimate of the cell-phone frequency drift, DriftCPhat=rangeRateCP+driftCShat−φDotCP (Hz at *baseCSfreq*)

And then, using the freqDiff and assuming the rangeRateCP=0, estimate the GPS clock drift as, DriftGR2hat=(driftCPhat−ΔF2)*(baseGRfreq/baseCSfreq)

(Hz at *baseGRfreq*)=(driftCShat−φDotCP−ΔF2)*(baseGRfreq/baseCSfreq)

(units are Hz at *baseGRfreq*).

Remove the cell-phone clock drift to compute velocity. In the case that the cell-phone is using the VCO to track the cell-site frequency and the freqDiff can observe the effect on the baseCPfreq.

The "truth" model for the observation,

FreqDiffVCO=((Nvco+(Q1−Q2)/M)*freqGR (in counts at CP freq).

Because only observe Nvco, our measurement,

FreqDiffVCO (observed)=Nvco (in integer counts at CP freq).

We then form the freqDiff estimate in units of Hertz.

ΔF2vco=(Nvco/M)*baseGRfreq−baseCSfreq (counts at CP freq).

Our model is then,

ΔF2vco=driftCSvco−driftGR2*(baseCSfreq/baseGRfreq)

(in Hertz at CP freq)=(rangeRateCP+driftCS)−driftGR2*(baseCSfreq/baseGRfreq).

Inserting the estimate of the cell-site drift, a measurement equation that can be used to solve for the user velocity and GPS receiver clock drift is made.

ΔF2vco=rangeRateCP+driftCShat−driftGR2*(baseCSfreq/baseGRfreq)

(in Hertz at CP freq).

Remove the cell-phone clock drift to predict the drift of the GPS receiver in the cell-phone.

The user velocity is zero. Such allows an estimate of the clock drift of the GPS receiver in the cell-phone.

Assume that the rangeRateCP is zero,

DriftGR2hat=(driftCShat−ΔF2vco)*baseGRfreq/baseCSfreq (in Hertz at GR freq).

This estimate can be used to reduce the frequency search required to find the GPS satellites. Thus, frequency transfer can be performed with this observation.

To estimate the user velocity, the measurement for method embodiment of the present invention (using the NCO in the cell-phone) is φDotCP=rangeRateCP+driftsCShat −(ΔF2+driftGR2*(baseCSfreq/baseGRfreq)).

Also the measurement for another embodiment of the present invention (using the VCO in the cell-phone) is ΔF2vco=rangeRateCP+driftCShat−driftGR 2*(baseCSfreq/baseGRfreq).

These equations are generalized for simplicity as,

PrrCP=C3*rangeRateCP−driftGR2*C1+C2 where for a method embodiment of the present invention, PrrCP=φDotCP
C1=(baseCSfreq/baseGRfreq)
C2=driftsCShat−ΔF2
C3=1/(λCP)
λCP=C/baseCSfreq.

For another method embodiment of the present invention, $$PrrCP = \Delta F2vco$$

C1=(baseCSfreq/baseGRfreq)
C2=driftsCShat
C3=1/(λCell-site)
λ=C/baseCPfreq.

Combine the cell-phone and GPS pseudorange rate measurements to estimate the user velocity and, the GPS receiver drift.

The cell-phone can track a set of J cell-cites and form the j-th pseudorange-rate observations as:

$$PrrCP(j) = C3 * rangeRateCP(j) - driftGR2 * C1 + C2 \text{(Hz at baseCPfreq)}$$

K GPS satellites form the k-th pseudorange-rate observations as:

$$PrGR2(k) = C6 * rangeRateGR2(k) - driftGR2 * C4 + C5 \text{(Hz at baseGRfreq)},$$

where:
C4=1
C5=driftSVhat (from the satellite ephemeris)
C6=1/(λGR)
(λ-GR)=C/baseGRfreq In order to solve for velocity, first perform the position solution, and then, predict the nominal rangeRateCP(j) as follows, $$RangeRateCPhat(j) = xVelCS(k)*uX(k) + yVelS$$
$$(k)*uY(k) + zVelCS(k)*uZ(k),$$

where,
uXCS(j)=(xCS(j)−x)/rangeGR 2
uYCS(j)=(yCS(j)−y)/rangeGR 2
uZCS(j)=(zCS(j)−z)/rangeGR 2.

However, for the cell-site, assume it is static so, xVelCS(k)=yVelCS(k)=zVelCS(k)=0.

Similarly, can predict the nominal rangeRateGR2 (k) as follows, $$RangeRateGR2hat(k) =$$
$$(xVelSV(k) - xVel)*uX(k) + (yVelS(k) -$$
$$yVel)*uY(k) + (zVelSV(k) - zVel)*uZ(k),$$

where,
uXSV(k)=(xSV(k)−x)/rangeGR2
uYSV(k)=(ySV(k)−y)/rangeGR2
uZSV(k)=(zSV(k)−z)/rangeGR2.

Making these substitutions, $$LinPrrCP(j) = PrrCP(j) - C3 * rangeRateCPhat(j) =$$
$$C3*(-uXCS(j)*xVel - uYCS(j)*yVel - uZCS(j)*zVel) -$$
$$driftGR2*C1 + C2$$

$$LinPrrGR2(k) = PrrGR2(k) - C3 * rangeRateGR2hat(k) =$$
$$C6*(-uXSV(k)*xVel - uYSV(k)*yVel - uZSV(k)*zVel) -$$

$$driftGR2*C4 + C5.$$

These are the equations in terms of only the user velocity and the GPS receiver clock drift. Thus, as long as four measurement from either multiple GPS satellites or multiple cell-sites are found, the velocity and drift using conventional methods (like least-square or a Kalman filter) can be solved.

To removing unknowns for the timeDiff and pseudoranges, the timeDiff measurements must be used.

The rangeGR1 is considered to be a known quantity since its components are known.

The satellite position and clock bias is considered known since it can be computed from the GPS ephemeris that can be circulated around the system by the server.

Assume that GPS receiver-1 is tracking enough satellites to compute at least its time solution. If its position is known, then only one satellite is needed to do this.

In timeDiff and pseudorange measurements, the pseudorange are formed by the cell-phone tracking the cell-site, φCP=rangeCP+BiasCS−BiasCP.

The pseudorange formed inside GPS receiver-1 at the cell-site, φGR1=rangeGR1+biasSV−biasGR1.

The pseudorange formed inside GPS receiver-2 at the cell-site, φGR2=range=GR2+biasSV−biasGR2.

With timeDiff observations between the GPS receiver-1 and the cell-site (Ni1 and Ni2), biasCSG=BiasGR1+TD1.

With timeDiff observations between the GPS receiver-2 and the cell-phone (Ni1 and Ni2), biasCPG=BiasGR2+TD2.

To solve for the clock bias of the GPS receiver as the cell-site, the rangeGR1 is known, and biasSV is known, and φGR1 is measured in GPS receiver-1, can estimate the clock bias for GPS receiver-1 as follows, $$biasGR1hat = \text{estimate of } (biasGR1) = rangeGR1 +$$
$$biasSV - \phi GR1.$$

To solve for the clock bias of the cell-site from GPS time, use the timeDiff measurement (TD1) between GPS receiver-1 and the cell-site. Estimate the bias between the cell-site and GPS time.

Either of the timeDiff measurements (N11 or N12) can be used.

$$TD1 = N11/freqGR1hat$$
$$TD2 = N12/freqGR1hat$$

where
FreqGRhat=baseGRfreq+driftGR1hat

Assume that biasGR1hat and driftGR1hat are known and are obtained directly from GPS receiver-1 at the cell-site.

Now, using the definition of the timeDiff, solve for the cell-site drift as follows,
using N11, then $$BiasCS1hat = TD1 + biasGR1hat \text{ (units are seconds)},$$

using N12, then $$BiasCS1hat = 1 - TD2 + biasGR1hat$$

(units are seconds)

Remove the cell-phone clock bias to compute position.

Assume the cell-phone produces the pseudorange measurement between the cell-phone and the cell-site.

The pseudorange formed by the cell-phone tracking the cell-site is φCP=rangeCP+BiasCS−BiasCP.

Apply the estimate of the cell-site clock bias and use the timeDiff between the cell-phone and GPS receiver-2. Such change of variables allows elimination of the cell-phone clock and cell-site clock, and to express the cell-phone derived pseudoranges in terms of the cell-phone location and GPS receiver-2's clock.

The timeDiff in the cell-phone has the form, $TD1=N11/freqGR2hat$ $TD2=N12/freqGR2hat$ where, FreqGRhat=baseGRfreq+driftGR2hat Forming the timeDiff without an estimate of the driftGR in the cell-phone, do not know have an estimate of the GPS receiver-2 drift until a position fix. Thus, re-formulate the model to obtain a model that represents the explicite effect of this paramter.

Normalize the observed timeDiff count with baseGRfreq rather than FreqGRhat.

In this case, $$TD1 = N11/freqGR =$$
$$N11 * (1/(baseGRfreq + driftGR) - 1/baseGRfreq +$$
$$1/baseGRfreq) =$$
$$N11 * ((baseGRfreq - baseGRfreq - driftGR)/$$
$$(freqGR*baseGRfreq) + 1/baseGR) =$$
$$N11 * (1/baseGRfreq - driftGR/(freqGR*baseGRfreq)) =$$
$$N11/baseGRfreq - N11*driftGR/(freqGR*baseGRfreq)$$

The measurement is not a linear function of driftGR because it represents up in both the numerator and denominator (inside freqGR) of the second term. While this can be handled, it is inconvenient. Thus, perform a simple approximation that linearizes the model. Replace the freqGR in the denominator with simply baseGRfreq.

Linearize the unknown GPS receiver drift to make the measurement linear in the variable driftGR. Remove the variable driftGR from the denominator.

Thus, examine the approximation of $driftGR/(baseGRfreq*freqGR)=$ $driftGR/(baseGRfreq*baseGRfreq).$ For again that driftGR=20PPM.

Solving for the "true" value, =
$549/(27.456e6 * 27.456549e6) = 7.282644976e-13.$ If approximate the denominator as baseGR*baseGR, then the ratio, then the ratio, $= 549/(27.456e6 * 27.456e6) = 7.282790418e-13.$ The difference=1.456220e−17.

Multiply by the max N1=baseGR, the error is 3.998197e-10=0.11 meters.

Thus, there is still a linear error model. If this technique didn't work, then the model would not be linear since the driftGR term represents up in the denominator.

To use the cell-phone pseudorange for positioning before have an estimate of driftGR2 is found, then include the drift term in the pseudorange. Normally, the pseudorange is only related to the position and clock bias. Thus, this formulation has an extra unknown. However, the pseudorange rates are available, all the unknowns can be solved together.

To use the tempMeas to estimate driftGR2, suppose that driftGR=20 PPM. Suppose that N11 was almost exactly equal to baseGR. That means the cell-site is just to the left of the GPS1-PPS. The additional term proportional to driftGR is driftGR/freqGR.

If the drift were 20 PPM, then driftGR=20*baseGR/1e6= 549 Hz and driftGR2/baseGR+driftGR=0.2 seconds.

The tempMeas observable are used. Using the SCXO calibration, the driftGR to an accuracy of+/0.5 PPM can be estimated.

The driftGR=0.5*baseGR/1e6 13.7 Hz. Such leads to a time error of 13.7/(27,456,014)=5.0e7=50 microseconds. Such is about 50 chips of the GPS pseudorandom code that repeats every 1023 chips.

The tempMeas will provide a good enough approximation for using the cell-phone pseudorange to predict the GPS receiver clock bias. Such can be used for prepositioning.

To work timeDiff measurement, we redefine the timeDiff for the cell-phone side as follows, Recall the measurement model, $TD1=N11/baseGRfreq-N11*driftGR/(freqGR*baseGR)$ Define, $TD1a=N11/baseGRfreq$ Thus, $TD1a=TD1+N11*driftGR/(freqGR*baseGR)$ Now, inserting the measurement model for the timeDiff at the cell-phone (don't include the quantization terms, so the parameters are the estimates and not the "true" parameters), $TD1=biasCPhat-biasGR2hat.$ Thus, $TD1a=biasCPhat-biasGR2hat+N11*driftGR2/$
$(baseGRfreq*baseGRfreq)$ Using this form, the additional term proportional to driftGR2 will account for the error in using baseGRfreq rather than freqGR to normalize.

Re-arrange the measurement model to solve for biasCPhat.

$BiasCPhat=N11/baseGR+biasGR2hat-N11*$ $driftGR/(baseGRfreq*baseGRfreq).$

The above formula is inserted into the cell-phone pseudorange so that all the clock terms are in terms of GPS receiver-2's clock.

$\phi CP=rangeCP+BiasCShat-$ $(N11/baseGR+biasGR2hat-N11*driftGR/(baseGRfreq*baseGRfreq)$ Define, $PrCP(j)=\phi CP=$ $D3*rangeCP(j)-biasGR2*D1+D2$ (units of seconds)

Where,

D1=1

$D2 = biasCShat - N11/baseGR + N11*driftGR/(baseGRfreq*baseGRfreq)$ (seconds)

$D3 = 1/C$ (units of seconds/meter)

Remove the cell-phone clock bias to predict the bias of the GPS receiver in the cell-phone with a method embodiment of the present invention.

To estimate the GPS receiver-2 bias directly, simply re-arrange the above formula to solve for it.

$$biasGR2hat = rangeCP + BiasCShat - \phi cp +$$

$$(N11/baseGR - N11*driftGR/(baseGRfreq*baseGRfreq)).$$

This equation gives a method to estimate the GPS receiver clock bias prior to tracking any GPS signals. For GPS, the maximum time-search window is one-millisecond. Thus, in order to reduce the search range, a clock bias estimate with an error that is significantly less than one millisecond is needed.

Suppose that the cell-phone is only one kilo-meter (1000 m) from the cell-site. Such is possible in Japan where the cell-site density is quite high.

Also suppose using the freqDiff to estimate driftGR2. Recall, $$\Delta F2 = driftCP - driftGR2*(baseCSfreq/baseGRfreq)$$

$$DriftGR2hat = (driftCShat - \phi DotCP - \Delta F2)*(baseGRfreq/baseCSfreq)$$

In this equation assume that the user velocity is zero.

Use the tempmeas to estimate driftGRscxo, that is, the estimate of the GPS receiver-2's clock drift using the tempMeas observation and the calibration model to estimate clock frequency from the tempMeas.

Assume the range from the cell-site is 1000, and use the driftGR estimate, $$biasGR2hat = (100/c) + biasCShat - \phi cp +$$

$$N11/baseGR - N11*(driftCShat - \phi DotCP - \Delta F2)/(baseCSfreq*baseGRfreq).$$

The accuracy of the estimate is dominated by the assumption that the distance to the cell site is 1000 m. Even at a distance of 2000 m, the accuracy would be about 1000/c= 3.3e-1=3.3 microsecond. The time-uncertainty has been reduced from 1 msec to 3.3 microsecond. That is an information gain of almost a factor of 300. Such is the kind of information gain that will allow a super-thin GPS client.

Remove the cell-phone clock bias to compute position.

Derive the measurement models when the cell-phone uses the VCO method embodiment of the present invention to track the carrier. The frequency is adjusted to match the phase of the incoming signal. The meaning of the timeDiff changes since the PPS associated with the cell-phone reference also moves as the frequency is adjusted.

The timeDiff no longer observes the cell-phone bias, but rather, it observes the cell-site bias and the range between the cell-site and the cell-phone. For example, if the cell-site clock bias is positive, then the cell-site must also increase its phase to be in alignment. To compensate for the travel time of the signal from the cell-site to the cell-phone, the cell-phone must further delay its signal in order to track the incoming signal. A phase advance is a positive increase in the phase.

The cell-phone clock bias is replaced by the rangeCP and the cell-site bias.

The "true" timeDiff models is:

$$TD1 = BiasCPvco - biasGR2,$$

where, $BiasCPvco = rangeCP + biasCS$

We have the same issue for the actual measurement, i.e, to normalize the timeDiff by the correct frequency. Normalize baseGRfreq and then account for the driftGR2 term explicitely.

Define, $$TD1a = N11/baseGRfreq.$$

Thus, $$TD1a = TD1 + N11*driftGR$$

$$/(baseGRfreq*baseGRfreq).$$

Now, inserting our model for the "true" TD1, and inserting the estimated parameters, (not including the quantization terms in our measurement model), $$TD1a = rangeCP + biasCShat - biasGR2 + N11*driftGR$$

$$/(baseGRfreq*baseGRfreq).$$

Define, $$PrCP(j) = N11/baseGR = D3*rangeCP(j) -$$

$$biasGR2*D1 + D2$$

(units of seconds)

Where, $D1 = 1$ $D2 = baseCShat - N11/baseGR + N11*driftGR/(baseGRfreq*baseGRfreq)$ (seconds)

$D3 = 1/C$ (units of seconds/meter)

Have an expression for the cell-phone pseudorange where the unknowns are the user position, and the GPS receiver clock errors. Even though the GPS receiver drift appears, the equations can still be solved.

Remove the cell-phone clock bias to compute position.

For time transfer for aiding the GPS acquisition, simply re-arrange the above equation to solve for biasGR. Once again, have two sources to estimate the GPS receiver clock drift. Either use the tempMeas observation or use the freqDiff and assume the user velocity is zero.

$$BiasGR2 = rangeCP + biasCShat - N11/baseGRfreq +$$

$$N11*driftGR2/(baserGRfreq*baseGRfreq).$$

Use the data from the tempMeas observation, $$biasGR2hat = rangeCP + biasCShat - N$$

$$11/baseGRfreq + N11*driftGR2SCXO/(baserGRfreq*baseGRfreq).$$

The combination of the freqDiff at the cell-phone assumes the cell-phone rangeRate is zero, $$DriftGR2hat = (driftCShat - \Delta F2vco)*baseGRfreq/baseCSfreq$$

(in Hertz at GR freq).

Inserting this, $$biasGR2 = rangeCP + biasCShat - N11/baseGRfreq + N$$

$$11*(driftCShat - \Delta F2vco)/(baserCSfreq*baseGRfreq)$$

(units are seconds)

To solving for Position/Velocity in the Dual mode system.

Combine the cell-phone pseudoranges with the GPS pseudoranges.

Define for a method embodiment of the present invention (NCO method embodiment of the present invention), $PrCP(j)=\phi CP=D3*rangeCP(j)-$ $biasGR2*D1+D2$ (units of seconds).

Where,

D1=1

D2=biasCShat−N11/baseGR+N11*driftGR/(baseGRfreq*baseGRfreq) (seconds)

D3=1/C (units of seconds/meter).

Or define for method embodiment of the present invention (VCO method embodiment of the present invention), $PrCP(j)=N11/baseGR=D3*rangeCP(j)-$ $biasGR2*D1+D2$ (units of seconds).

Where,

D1=1

D2=baseCShat−N11/baseGR+N11*driftGR/(baseGRfreq*baseGRfreq) (seconds)

D3=1/C (units of seconds/meter).

And define the GPS observations as, $PrGR2\ (k)=D6*rangeSV(k)-D4*driftGR$ $2+D5.$ Where,

D4=1

D5=biasSV

D6=1/C.

As with the pseudorange-rates, linearize them with respect to position by subtracting the nominal range.

Define the delta vector as the error between the "true" position vector and the starting estimate of the position. In the estimation process, compute the delta vector and then add it to the starting position to get the position estimate. Thus, assume that when forming the predicted quantities where the user position is needed, use xNominal.

Define the error in our nominal estimate (xNominal) as delX.

delX=x-xNominal delY=y-yNominal delZ=z-zNominal

Assume having measurement to J cell-sites and K satellites. The linearized measurement for the j-th cell-site and the k-th GPS satellite are, $LinPrCP(j) = PrCP(j) - D3*rangeCPhat(j) =$ $D3*(-uXCS(j)*delX - uYCS(j)*delY - uZCS(j)*delZ) -$ $biasGR2*D1 + D2$ $LinPrGR2(k) = PrGR(k) - C3*rangeGRhat(j) =$ $D6*(-uXSV(k)*delX - uYSV(k)*delY - uZSV(k)*delZ) -$ $biasGR2*D4 + D5$ where the uXCS and uXSV are the same as defined in the pseudorange-rate section.

The Dual Mode system has derived the solution equations that relate all observable in the system to the user position/velocity and clock bias and drift of the GPS receiver in the cell-phone. All other system clocks have been calibrated out of the system.

Standard solution techniques can then be used to solve for the eight unknowns.

To get a solution, many observations have unknowns. That means that four observation that have the user position are needed. The derivative measurements are also needed. Estimate the GPS receiver velocity and clock drift.

The cell-phone measurements along with the timeDiff, freqDiff, and tempMeas observables can be used to improve the acquisition of the GPS satellites by reducing the search range for those signals. Estimate the GPS receiver clock bias and drift with respect to the cell-phone and the calibration of the cell-sites.

The system is a truly distributed processing system. Depending on the client type, all the calibrations and calculation could either be done in the cell-phone, in the network server, or spread between the two systems. However, the server is the conduit that sends the calibration numbers for the cell-sites so that the data can be used for both time and frequency transfer that improves GPS acquisition times, and for Dual mode operation where use the range and range-rates from both systems to compute the cell-phone position.

A communications means between the cell-site, the server, the cell-phone, and the GPS receivers at both the cell-site and the cell-phone is assumed. However, the details of the specific methods used are not critical to the equations presented here.

GPS receiver-1 is at the cell site. It tracks GPS continuously and estimates its position, clock bias and clock drift. It performs a timeDiff and freqDiff between the GPS receiver and the Cell-site clock. It sends the measurements and its solutions back to the network server. Server computes the cell-site clock bias and drift. It also send other GPS data to the network server such as the 50 bps Navigation data message.

The network server accepts the data from the cell-site and builds a table of the clock bias and drift of each cell-site. It also can generate a cell-site position from the GPS receiver position. The network server builds a Navigation Data database that is distributed throughout the system as a source of data for computing the satellite position, velocity, clock bias and drift.

GPS receiver-2 is at the cell-phone to compute the position of this receiver. At turn on, don't know the GPS receiver clock bias, drift, or position. It performs a timeDiff, freqDiff, and tempMeas. The cell-phone receiver tracks a cell-site (at least one). By tracking the phase and frequency of the carrier, it can also form pseudoranges and pseudorange-rates between the cell-site. Using these measurements, plus the cell-site data that includes the cell-site clock bias and drift, and the cell-site position, and using the timeDiff, freqDiff, and tempMeas observations, can perform time and frequency transfer between the cell-phone and the GPS receiver. After acquitting one GPS satellite, can also use the observations to compute the dual-mode position/velocity.

The time and frequency transfer allows us to improve the acquisition of the GPS satellites by reducing the search range. Such improves acquisition time and sensitivity. Such allows the super-thin-client.

After at least one GPS satellite is acquired, the range and range-rate measurements from both systems can be combined to compute the cell-phone position. Such should allow a positioning capability when fewer than normal of the measurements from each system are available. For example, a three-dimensional fix can be made with only 1 GPS satellites, and 3 cell-sites, or 2GPS satellites and 2 cell-sites, or 3 GPS satellites and only one cell-site.

Actually, one can compute the cell-phone position without any GPS satellite tracked at the cell-phone. Because the cell-sites do significant relative vertical displacement, the three-dimensional solution is very noisy. However, a two-dimensional solution is possible if altitude of the cell-phone is available. (Remember, the GPS satellites are still needed at the cell-sites for synchronizing the cell-sites.) A three-dimensional-CDMA-only is also possible if the cell-sites have good vertical separation.

GPS-navigation almanac and ephemeris are acquired and reduced by the webserver 106 with its own reference-station GPS-receiver to supply simple polynomials that respectively represent each satellite's position and velocity. Such polynomials will, of course, go stale over time, but periodic contact between the cell-site 102 and webserver 106 via the Internet are critically depended upon to provide fresh-enough orbit data. The GPS receiver 112 is therefore relieved of the storage-intensive requirement to hold current ephemeris and almanac data in local RAM/ROM, and relieved of the processor-intensive job of locally computing double-precision floating-point math the satellite-orbit positions for every position fix.

In a business-model embodiment of the present invention, the webserver 106 is owned and operated by an independent service provider. Per-use or subscription fees are charged to users who operate the cell-phone 104 and/or cell-site 102. The cell-phone 104 is alternatively further bundled in an intellectual property (IP) package for semiconductor integrated circuit device designs of application-specific network clients. Such IP is sold for a license fee and hardware-device cost to original equipment manufacturers (OEM's) of network clients.

In operation, the GPS receiver 112 must simultaneously search for GPS-microwave signals in two domains, e.g., frequency and code-phase. The local oscillator and Doppler shift caused by satellite vehicle relative velocity create carrier frequency uncertainties that are resolved. The instantaneous GPS-satellite pseudo-random number (pseudo-random number) code phase is another unknown. Received signals that are above the "noise floor" are relatively easy and quick to search. But weak signals, as exist inside buildings, are buried in as much as twenty decibels of noise. Each visit to a frequency/code-phase bin must dwell there long enough to "beat down" the noise floor with processing gains provided by code correlators. Weak signals also require that the search bins have finer steps between bin frequencies and bin code-phase, e.g., due to aliasing. So more bins are needed to be searched and each bin needs more processing dwell, all of which increases search time exponentially.

The webserver 106 publishes real-time navigation data to the Internet. Other services currently exist that put up partial or non-real-time navigation and initialization data on the Internet, and these can be used partially in place of, or to check the validity of real-time navigation data being sent to the GPS receiver 112. A primary and critical role job for webserver 106 is the off-loading of navigation-computational chores from the GPS receiver 112. The degree to which such off-loading can be carried depends on the regularity of communication contact that can be realized between the GPS receiver 112 and the webserver 106. The actual measurements obtained by the GPS receiver 112 are forwarded to the webserver 106.

Alternative embodiments of the present invention incorporate webservers 106 that do database processing for higher-level abstractions and purposes. For example, the server platform includes a health and quality monitor for checking said static observations and preventing an inclusion of incorrect information in said database of measurement errors and satellite data messages. On another front, webserver 106 could collect position solution information over time for the pattern of locations that GPS receiver 112 visits over a period of hours, days, weeks, months, years, etc. Such information can then be processed to estimate where the user of GPS receiver 112 is, where the user has been, or where the user is likely to be in the future. Such information is useful to dispatch, time-clock, house-arrest, deployment, inventory, asset management, military, security, and other kinds of applications. Position information can be interpreted to intelligently guess at what the user is doing at any one moment. For example, if the user's position matched that of a local grocery store, the user could be assumed to be shopping. Logs can also be generated by the user at the webserver 106, e.g., by city maintenance department collocating with and "marking" in the electronic database the permanent location of a fire hydrants, power transformers, roadways, etc.

The presence on the Internet of information about a user's position can be used by advertisers and marketers to direct contextual messages to the user in real-time. Such data is sold in real-time in a business model embodiment of the present invention.

In general, embodiments of the present invention use Internet webservers to process data collected by remote GPS receivers in such ways that signal sensitivity is increased and search times are shortened compared to conventional receivers and methods.

Recent test data indicates the a priori worst-case modeling error for a typical crystal frequency is around ±0.5 PPM (±787 Hz) with temperature modeling. To be conservative, and leave some uncertainty for user position error effect on the frequency, a frequency range of ±1000 Hz for the first satellite is preferably searched. If there is a high degree of confidence about the frequency information learned in a first search, the frequency search range of subsequent satellites can be constrained to save time and effort. Alternatively, such searching-time savings could be traded for a slower clock speed as would be found in less expensive hardware.

FIG. 10 is a functional block diagram of a second infrastructure-assisted navigation system embodiment of the present invention, and is referred to herein by the general reference numeral 1000. The special case in which system 1000 is needed is where no political or economic opportunity exists to include a GPS receiver at a cellular-telephone base site, e.g., system 100 (FIG. 1). So a cell-phone and GPS receiver combination permanently parked at a stationary location can be adapted to serve instead. A business model embodiment of the present invention deploys apparently ordinary cellphones on fixed station in each cell site where business coverage is needed but not otherwise available. Such non-availability can result from hostile base cell-site operators, adverse or cumbersome laws, too little time, too much expense, etc.

System 1000 includes a service provider 1002 connected to a data network 1004, e.g., the Internet. A cellular base station 1006 simply handles ordinary cellular telephone calls between stations with telephone numbers. A visiting, mobile cell user 1008 is able to make and receive telephone calls through the cellular base station 1006. A business that operates the service provider 1002 has previously deployed a permanent, parked cell station 1010 that is within the service area of the cellular base station 1006. It too is accessible to other parts of the system via telephone calls made through the cellular base station 1006.

The service provider 1002 includes a GPS receiver 1012, a network server 1014, and a database 1016 for storing temperature, time, and frequency data and models. The cell-site 1006 comprises a cellular transceiver 1018 and no GPS receiver. The cell-phone 1008 also includes its own GPS receiver 1020 and cellular transceiver 1022. The permanent, parked cell station 1010 has a GPS receiver 1024 and a cellular-phone-service-band transceiver 1026 that is used to track the frequency and phase of signals it receives from the cell-site 1006. The network server 1014 receives and distributes time information and other data from both the cell-site and cell-phone GPS receivers over data network 1004. A database 1016 of positions and their time and frequency offsets from GPS time is collected for later reference.

As in system 100 (FIG. 1), three hardware-based measurements can be used to synchronize the local clocks in two independent systems, e.g., (1) time-difference, (2) frequency difference, and (3) crystal temperature-versus-frequency models. Any or all three can be used to synchronize clocks. In a timeDiff observable, if the time difference between time events from two different time sources is known, the time of an event at one time source can be used to compute the time of the event at the other time source. In a freqDiff observable, if the frequency difference between two clocks is known, then finding the frequency of one can be used to predict the frequency of the other. In a tempMeas observable, a temperature-frequency calibration model is used to predict the frequency of a local GPS clock by measuring the crystal temperature. If one of the time sources is a GPS receiver, other clocks can be related to GPS time. Such potentially allows devices all around the world to be time and frequency synchronized to a common and stable reference, for example, the GPS system atomic clocks.

Passive network synchronization embodiments of the present invention use the GPS receiver 1024 to measure the cell-site 1006 clocks in GPS time. Then the cell-phone GPS receiver 1020 clock and the cell-phone 1022 clock can be synchronized to GPS time by the network server over a network infrastructure, e.g., the Internet. A typical GPS receiver generates a one-pulse-per-second (1-PPS) time reference that can be compared and related with timeDiff circuitry to a 1-PPS clock derived from each of the cell-site and cell-phone cellular-telephony radio carriers. Other observation intervals besides one second would also work the same way, but the mathematics are simpler when a one second time interval is used.

Embodiments of the present invention can use three different communication links to transfer time and frequency data. One links the GPS reference receivers 1024 with the network server 1014. A second carries software-API or packet-communication between the cell-phone 1022 and GPS receiver 1020 in the cell-phone, either directly in the cell-phone or indirectly through the network server. Sharing data directly between the GPS receivers helps improve system performance. A third connection links the network server 1014 to both the cell-phone 1022 and GPS receiver 1020.

Time-difference-of-arrival measurements (TDOA), e.g., from a cell-phone 1010 to a cell-phone 1008, can be used for positioning inside a combined cell-phone and GPS receiver to improve positioning availability and accuracy. Time-stamps sent from the cell-phone 1010 to the cell-phone 1008 can be combined with a priori knowledge of the cell-phone 1010 position, the cell-phone 1010 clock bias and the cell-site 1006 drift from GPS time. Such time-stamps can be used to transfer time information from the cell-phone 1010 to the cell-phone 1008 with an accuracy affected only by the radio-signal propagation distance between.

The corrective frequency offset of the cell-phone carrier-frequency synthesizer loop is again used here in this embodiment to estimate the GPS receiver frequency offset. Such estimate is used to reduce the frequency uncertainty and thus reduce the time-to-first-fix, improve receiver sensitivity, and/or reduce the size and power-consumption of the hardware. Digital numeric-controlled oscillator (NCO) and analog voltage-controlled oscillator (VCO) are both commonly used in such carrier-frequency synthesizer loops.

Any tempMeas measurement can be used to further improve the frequency-transfer accuracy passing from a cell-phone to a GPS receiver, e.g., by building temperature models. The freqDiff observation can be used alone in frequency transfers without any timeDiff observation. The timeDiff observation can also be used without the freqDiff observation for combined time and frequency transfers. The time transfer accuracy is preferably improved by reducing the timeDiff hardware quantization noise with software-based filters. Cell-phone observations of the cell-phone 1010 frequency and phase can be used in dual-mode positioning system alternative embodiments of the present invention.

The term "passive synchronization" as used herein means the time and frequency offsets of the clocks in the cell-phone 1010 and cell-phone are only observed with respect to a GPS receiver clock. Calibrations are made later by sending the measured offsets through the communication layers, e.g., using transfer control protocol/Internet protocol (TCP/IP) packets on the Internet. The real clocks in the cell-phone and cell-phone 1010 are not controlled. The signals from these clocks are merely observed, and the corrective data obtained is not in any way fed back to the source to change the clocks. Rather, the data is used mathematically at the network server and in the GPS receiver software to assist in the GPS-satellite search and then in the position calculation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A satellite-navigation system, comprising,
   a first satellite-navigation receiver that provides for a first position solution;
   a first wireless communications device collocated with the first satellite-navigation receiver and connected to share at least one of time and frequency measurements with the first satellite-navigation receiver;
   a second satellite-navigation receiver for providing an accurate time and frequency estimate;
   a second wireless communications device collocated with the second satellite-navigation receiver and able to make radio contact with the first wireless communications device; and
   a webserver for post-processing of said first position solution with said accurate time and frequency estimate and for extracting a more accurate second position solution for the first satellite-navigation receiver, and connected by a data network to the second satellite-navigation receiver and second wireless communications device.

2. The system of claim 1, wherein: the second satellite-navigation receiver and second wireless communications device are at a fixed location and a local differential correction measurement is obtained and communicated to the webserver for providing increased accuracy position solutions for the first satellite-navigation receiver.

3. The system of claim 1, wherein:

the webserver provides information to the first satellite-navigation receiver that reduces at least one of local-oscillator frequency uncertainty and time uncertainty, and provides for improved satellite search times and sensitivity.

4. The system of claim 3, wherein:

the webserver computes time-difference information by comparing time measurements between the first and second satellite-navigation receiver as communicated over a radio contact and said data network.

5. The system of claim 3, wherein:

the webserver computes frequency-difference information by comparing carrier frequency measurements between the first and second wireless communication devices, and such measurements are communicated over a radio contact and said data network.

6. A satellite-navigation system, comprising, a first satellite-navigation receiver that provides for a user position solution;

a cell-phone collocated with the first satellite-navigation receiver and connected to share time and frequency measurements with the first satellite-navigation receiver;

a second satellite-navigation receiver for providing an accurate time and frequency estimate;

a base cellular telephone site collocated with the second satellite-navigation receiver and able to make radio contact with the cell-phone; and a webserver for post-processing of said user position solution with said accurate time and frequency estimate and for extracting a more accurate second position solution for the first satellite-navigation receiver, and connected by a data network to the second satellite-navigation receiver and base cellular telephone site.

7. The system of claim 6, wherein:

the second satellite-navigation receiver and base cellular telephone site are at a fixed location and a local differential correction measurement is obtained and communicated to the webserver for providing increased accuracy position solutions for the first satellite-navigation receiver.

8. The system of claim 6, wherein:

the webserver provides information to the first satellite-navigation receiver that reduces at least one of local-oscillator frequency uncertainty and time uncertainty, and provides for improved satellite search times and sensitivity.

9. The system of claim 8, wherein:

the webserver computes time-difference information by comparing time measurements between the first and second satellite-navigation receiver as communicated over a cellular radio contact and said data network.

10. The system of claim 8, wherein:

the webserver computes frequency-difference information by comparing carrier frequency measurements between cellular telephone devices, and such measurements are communicated over a cellular radio contact and said data network.

11. The system of claim 3, wherein:

the webserver collects temperature measurement (tempMeas) observables and stores them in a database from which it later builds a temperature-frequency model used to improve receiver sensitivity and acquisition performance in a software-compensated-crystal-oscillator (SCXO).

12. The system of claim 1, wherein:

a minimum of one GPS satellite and three cell site base stations are used in a dual mode system configuration.

13. The system of claim 3, wherein:

the webserver includes a global positioning system (GPS) digital signal processor (DSP) application specific integrated circuit (ASIC) that integrates time-difference, frequency-difference, and temperature-measurement infrastructure-information for improved satellite acquisition and receiver sensitivity.

14. The system of claim 1, wherein:

position-solution calculations are distributed amongst the webserver and the wireless communications devices.

15. A satellite-navigation system, comprising, a first satellite-navigation receiver that provides for a first position solution;

a first cell-phone collocated with the first satellite-navigation receiver and connected to make and share at least one of time and frequency measurements made with the aid of the first satellite-navigation receiver;

a second satellite-navigation receiver for providing an accurate time and frequency estimate;

a second cell-phone collocated with the second satellite-navigation receiver and able to make a telephone connection with the first cell-phone through a cellular base station located in the area; and a webserver with telephone access to each of the cell-phones via the cellular base station, and for post-processing of said first position solution with said accurate time and frequency estimate and for extracting a more accurate second position solution for the first satellite-navigation receiver, and connected by a data network to the second satellite-navigation receiver and second cell-phone;

wherein, the first satellite-navigation receiver and first cell-phone are permanently parked at a stationary location and are continually accessible to the webserver.

16. A navigation system comprises a cell-phone, a base cellular telephone site, and a webserver, wherein each are paired with a global positioning system (GPS) receiver;

wherein, a GPS receiver associated with the cell-phone is aided with information received from the cell-site and webserver that help reduce satellite search uncertainty with time-difference and/or frequency-difference measurements taken with data collected using local cell-phone and GPS receiver time and frequency; and wherein, correction information is used in post-processing of any velocity solutions computed by the cell-phone.

* * * * *